(12) United States Patent
Grothe

(10) Patent No.: US 10,344,616 B2
(45) Date of Patent: Jul. 9, 2019

(54) STATOR DEVICE FOR A CONTINUOUS-FLOW MACHINE WITH A HOUSING APPLIANCE AND MULTIPLE GUIDE VANES

(71) Applicant: Rolls-Royce Deutschland Ltd & Co KG, Blankenfelde-Mahlow (DE)

(72) Inventor: Patrick Grothe, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 416 days.

(21) Appl. No.: 15/192,417

(22) Filed: Jun. 24, 2016

(65) Prior Publication Data

US 2016/0376916 A1    Dec. 29, 2016

(30) Foreign Application Priority Data

Jun. 25, 2015 (DE) .......................... 10 2015 110 249

(51) Int. Cl.
*F01D 17/16*      (2006.01)
*F02C 6/08*       (2006.01)
(Continued)

(52) U.S. Cl.
CPC ............. *F01D 17/162* (2013.01); *F01D 5/12* (2013.01); *F01D 9/041* (2013.01); *F02C 6/08* (2013.01);
(Continued)

(58) Field of Classification Search
CPC .......... F01D 17/162; F01D 5/12; F01D 9/041; F01D 17/16; F04D 29/321; F04D 29/563;
(Continued)

(56) References Cited

U.S. PATENT DOCUMENTS 3,652,177 A * 3/1972 Loebel .................. F01D 17/162
                                                        415/110
4,711,084 A * 12/1987 Brockett .................. F02C 3/32
                                                         60/785
(Continued)

FOREIGN PATENT DOCUMENTS

DE      102008019603 A1    10/2009
EP         1010862 A2       6/2000
(Continued)

OTHER PUBLICATIONS

European Search Report dated Nov. 21, 2016 for counterpart European Application No. 16175765.3.
(Continued)

*Primary Examiner* — Jason D Shanske
*Assistant Examiner* — Joshua R Beebe
(74) *Attorney, Agent, or Firm* — Shuttleworth & Ingersoll, PLC; Timothy J. Klima

(57)   ABSTRACT

A stator device for a continuous-flow machine with guide vanes circumferentially distributed on a housing. The guide vanes are respectively embodied with a blade leaf and at least one platform. The platforms form a surface of an annular channel through which working fluid flows. A flow area is provided via which, during operation of the stator device, a working fluid flows on a side of the platform that is facing away from the annular channel from a pressure side of the blade leaf to a suction side of the blade leaf at least in certain areas in the radial direction of the stator device. At least one suction appliance is provided which adjoins the flow area and is formed by a recess, and via which working fluid can be conducted out of the flow area during operation of the stator device.

20 Claims, 14 Drawing Sheets

(51) Int. Cl.
  *F04D 29/56*   (2006.01)
  *F01D 5/12*   (2006.01)
  *F01D 9/04*   (2006.01)
  *F04D 29/32*   (2006.01)
  *F04D 29/68*   (2006.01)

(52) U.S. Cl.
  CPC ......... *F04D 29/321* (2013.01); *F04D 29/563* (2013.01); *F04D 29/682* (2013.01); *F05D 2220/32* (2013.01)

(58) Field of Classification Search
  CPC .... F04D 29/682; F04D 29/547; F04D 29/083; F04D 29/56; F05D 2220/32; F02C 6/08
  See application file for complete search history.

(56) References Cited

U.S. PATENT DOCUMENTS

| | | | | |
|---|---|---|---|---|
| 4,861,228 | A * | 8/1989 | Todman | F01D 17/162 415/115 |
| 6,210,106 | B1 | 4/2001 | Hawkins | |
| 6,283,705 | B1 * | 9/2001 | Rice | F01D 17/162 415/160 |
| 7,980,815 | B2 * | 7/2011 | Cloarec | F01D 17/162 415/148 |
| 8,043,046 | B2 | 10/2011 | Guemmer | |
| 8,152,444 | B2 | 4/2012 | Guemmer | |
| 8,251,646 | B2 | 8/2012 | Jahns | |
| 2008/0253882 | A1 * | 10/2008 | Major | F01D 5/147 415/148 |
| 2008/0298951 | A1 * | 12/2008 | Brault | F01D 17/105 415/58.5 |
| 2010/0232935 | A1 * | 9/2010 | Twell | F01D 17/162 415/151 |
| 2011/0058931 | A1 * | 3/2011 | Domercq | F01D 17/162 415/148 |
| 2011/0110773 | A1 * | 5/2011 | Domercq | F01D 17/162 415/191 |
| 2015/0159551 | A1 | 6/2015 | Lahmer et al. | |

FOREIGN PATENT DOCUMENTS

| | | |
|---|---|---|
| EP | 1528226 A2 | 5/2005 |
| EP | 2103811 A2 | 9/2009 |
| EP | 2113637 A2 | 11/2009 |
| EP | 2881548 A1 | 6/2015 |
| GB | 743782 A | 1/1956 |
| GB | 2234299 A | 1/1991 |
| JP | 2002195196 A | 7/2002 |

OTHER PUBLICATIONS

German Search Report dated May 23, 2016 from counterpart German App No. 102015110249.8.
European Search Report dated Nov. 18, 2016 from related European Application No. 16174990.7.
German Search Report dated May 23, 2016 from related German Application No. 102015110250.1.

* cited by examiner

STATOR DEVICE FOR A CONTINUOUS-FLOW MACHINE WITH A HOUSING APPLIANCE AND MULTIPLE GUIDE VANES

This application claims priority to German Patent Application 102015110249.8 filed Jun. 25, 2015, the entirety of which is incorporated by reference herein.

The invention relates to a stator device for a continuous-flow machine with a housing appliance and multiple guide vanes according to the kind as it is more closely defined herein and a blade wheel device according to the kind as it is more closely defined herein.

Stator devices of compressors of aircraft engines that are embodied with guide vanes that are designed so as to be adjustable around a central axis are generally known from practice. The guide vanes that are arranged in a circumferentially distributed manner inside a housing appliance have respectively one blade leaf and a platform that connects in the radially outward direction of the stator device and that is also referred to as a penny, wherein, together with the housing appliance, the platforms delimit a core flow channel of the aircraft engine in the radial direction of the stator device. Also connecting in the radial direction of the aircraft engine, on a side of the platforms that is facing away from blade leaf, is respectively one spindle-shaped area via which the guide vanes are mounted so as to be twistable around a central axis of the spindle-shaped area with respect to the housing appliance. The platform, which is embodied with a circular cross-section with respect to the central axis of the spindle-shaped area, has a larger cross-section with respect to the central axis of the spindle-shaped area than the spindle-shaped area. The platforms are respectively mounted in a recess of the housing appliance that is concentric with respect to the central axis of the spindle-shaped area, wherein a circumferential gap is present between the housing appliance and the platforms of the guide vanes. Also, a surface of the platforms that is facing away from the core flow channel is arranged at a distance with respect to the housing appliance in the radial direction.

A continuous-flow machine that is embodied with such a stator device has the disadvantage that it has an unsatisfactory level of efficiency.

The present invention is based on the objective to provide a stator device and a blade wheel device, wherein a level of efficiency of a continuous-flow machine that is embodied with such a stator device or blade wheel device is improved.

According to the invention, this objective is achieved with a stator device with features as disclosed herein.

What is suggested is a stator device of a compressor or a turbine for a continuous-flow machine, in particular of a stationary gas turbine or of an aircraft engine, with a housing appliance and multiple guide vanes that are arranged in a circumferentially distributed manner at the housing appliance. Here, the guide vanes are respectively embodied with a blade leaf and respectively at least one platform. The platforms at least in certain areas form a surface of an annular channel through which working fluid flows during operation of the stator device, and delimit the same preferably at least in certain areas in the radial direction of the stator device. The platforms are respectively mounted so as to adjustable with respect to the housing appliance, in particular so as to be rotatable around a middle axis of the platform. A flow area is provided, via which a working fluid flows during operation of the stator device from a downstream pressure side of the blade leaf to an upstream suction side of the blade leaf at least in certain areas in the radial direction of the stator device on a side of the platform that is facing away from the annular channel.

According to the invention, at least one suction appliance is provided that is adjoining the flow area and is formed by a recess, via which working fluid can be conducted away from the flow area during operation of the stator device.

The solution according to the invention is based on the insight that through the flow area, which is in particular formed at least in certain areas by a recess in the radial direction of the guide vane between the platform and the housing appliance and a recess in the radial direction of the stator device between a surface of the platform that is facing away from the blade leaf and the housing appliance, a part of the working fluid that is conducted through the annular channel is conducted as a leakage flow during operation of a continuous-flow machine that is embodied with a stator device according to the invention. Due to the pressure difference between the pressure side and the suction side of the blade leaf and an increasing pressure gradient in flow direction of the working fluid in the annular channel, the leakage flow is guided through the flow area during operation. Due to the relatively high pressure in the area of the downstream pressure side of the blade leaf, a part of a main flow that is flowing through the annular channel is guided in a undesired manner from the downstream pressure side of the blade leaf via a side of the platform that is facing away from the annular channel to an upstream suction side of the blade leaf, in the area of which the pressure is lower as compared to the pressure in the area of the pressure side. As the leakage flow flows out from the flow area into the area of the suction side of the blade leaf, the leakage flow that exits the flow area interacts with the main flow of the working fluid in the annular channel, wherein a so-called blockage area occurs in the main flow, having a flow velocity that is reduced with respect to surrounding areas of the main flow. As a result of this effect, the leakage flow has a considerable negative impact on the level of efficiency of the continuous-flow machine.

By providing the suction appliance, a mass flow of the leakage flow, which enters from the flow area into the main flow of the annular channel in the area of the suction side of the blade leaf, is reduced or an inflow of leakage flow into the annular channel in the area of the suction side of the blade leaf is completely avoided. This is achieved by connecting the suction appliance, on a side that is facing away from the flow area, with a space in which a static pressure is present that is lower that a static pressure in the flow area. Thus, during operation of the stator device, at least one part of the mass flow that is extracted from the main flow in the area of the pressure side, is not guided via the flow area at the suction side back into the main flow inside the annular channel, but is branched off from the flow area. By conducting away a part of the leakage flow from the flow area, the main flow in the area of the suction side of the blade leaf is negatively impacted to a considerably lesser degree as compared to the embodiments without a suction appliance. In this manner, a lossy interaction of the leakage flow with the main flow is reduced, which advantageously results in an improved level of efficiency and consequently also in a reduced specific fuel consumption of a continuous-flow machine that is embodied with a stator device according to the invention.

In addition, the reduction of the leakage flow that flows in the area of the stator device into the main flow by providing the suction appliance according to the invention, also advantageously has a positive effect on blade devices that are arranged downstream in the annular channel of the stator device.

In principle, the platforms can form an inner part of the surface of the annular channel with respect to the radial direction of the stator device and/or also an outer part of the surface of the annular channel with respect to the radial direction of the stator device, wherein a suction appliance can be provided in the area of the inner and/or outer platforms with respect to the radial direction of the stator device.

The suction appliance is preferably embodied as a material recess in the housing appliance and can for example be formed in a channel-shaped manner or as a bore. As an alternative to this, the recess can be embodied by means of a separate structural component.

In an advantageous embodiment of a stator device according to the invention, it is provided that the suction appliance directly adjoins the surface of the annular channel. As an alternative to this, it can also be provided that the suction appliance adjoins the flow area in the radial direction of the stator device at a distance to the surface of the annular channel. In a platform that connects radially outwards to the blade leaf of the guide vane, the suction appliance adjoins the flow area preferably in the radial direction of the stator device outside of the annular channel, while in a platform that connects radially inwards at the blade leaf of the guide vane, the suction appliance adjoins the flow area preferably in the radial direction of the stator device inside the annular channel.

A stator device that is characterized by low losses in the area of the suction appliance extends substantially in the radial direction of the stator device. Principally, the suction appliance, which can for example be embodied as a bore, can be arranged so as to be angled with respect to the radial direction of the stator device or so as to extend in a bent manner, wherein one embodiment of the suction appliance is in particular chosen in such a manner that during operation of the stator device a flow in the area of the suction appliance does not detached.

The suction appliance can be connected to the flow area in an area that is facing towards the pressure side of the blade leaf and/or in an area that is facing towards the suction side of the blade leaf of the guide vane, wherein the position of the suction appliance does not have a substantial impact on the suction effect.

In order to ensure that the leakage flow is sucked out of the flow area by the suction appliance in a desired manner in all adjustment positions of the guide vanes, the suction appliance extends in the circumferential direction of the guide vane across an angular range, which is in particular larger than 20°, preferably larger than 30°, in an advantageous embodiment of the stator device, wherein the respectively chosen angular range is adjusted to the maximal adjustment angle of the guide vane and can for example also be 180°. In this way, it can be achieved in a simple manner that the suction appliance that is integrated in the housing appliance is connected to the flow area in every position of the guide vane. In addition, a mass flow that reenters the main flow in the area of the suction side of the blade leaf can be reduced in this manner.

It can also be provided that the suction appliance is embodied in such a manner that the suction appliance is connected to the flow area only in certain adjustment positions of the guide vanes and is not connected to the flow area in other adjustment positions. Thus, it can for example be achieved in a simple manner that leakage flow is suctioned off via the suction appliance from the flow area only during partial load operation of the aircraft engine, and not during nominal operation.

In an advantageous embodiment of a stator device according to the invention, the suction appliance extends inside the housing appliance so as to substantially run along the circumference with respect to a central axis of the stator device. Such an embodiment of the suction appliance is easy to manufacture, with leakage flows in the flow areas of all guide vanes of the stator device being easy to suction off from the respective flow areas and to supply to a common space, for example. Here, in order to achieve a sufficient degree of stability of the stator device, webs by which the housing appliance is reinforced in the area of the circumferential suction appliance can be provided in a circumferentially distributed manner with respect to a central axis of the stator device.

In an advantageous embodiment of the stator device according to the invention, the housing appliance can have a recess, which adjoins the annular channel in the area of the guide vane and via which a mass flow can be conventionally extracted from a main flow in a targeted manner during operation of the stator device. Together with the mass flow that is extracted from the leakage flow via the suction appliance, the mass flow that is extracted in the area of the recess can be used as bleed air in the known manner.

In a particularly advantageous further development of the stator device according to the invention, it is provided that at least one platform is arranged in the axial direction of the stator device between two reference points of the annular channel, wherein a first reference point represents a boundary point of the annular channel, which is arranged at 10% of an axial extension of the platform with respect to a central longitudinal axis of the platform upstream of a front end of the platform, and wherein a second reference point represents a boundary point of the annular channel, which is arranged at 10% of the axial extension of the platform with respect to the central longitudinal axis of the platform downstream of a rear end of the platform, wherein at least one edge area of the platform projects into the annular channel in the radial direction of the stator device with respect to a rectilinear connection of the two reference points.

Due to the fact that the platform projects into the annular channel in the manner of a ledge at least with an edge area, the pressure conditions of the main flow in the area of the edge areas of the platform of the guide vanes are advantageously influenced in such a way that a mass flow that flows through the flow area during operation of the stator device is reduced as compared to an embodiment of the guide vane in which the platform does to project into the annular channel. In this way, a mass flow that, during operation of the stator device, flows through the flow area from the pressure side of the blade leaf to the suction side of the blade leaf is diminished, whereby a lossy interaction of the leakage flow with the main flow is reduced. In this manner, a level of efficiency of a continuous-flow machine having such a stator device is further improved, and also specific fuel consumption is reduced. In addition, the edge area of the platform that projects into the annular channel also advantageously influences the pressure conditions in the area of a platform adjacent in the circumferential direction of the stator device.

A leakage flow that is guided through the flow area during operation of the stator device is particularly small when the edge area of the platform that is projecting into the annular channel with respect to the rectilinear connection of the two reference points is located in a front area of the platform in the axial direction of the stator device. This is due to the fact that, in the area of the edge area that projects into the annular channel, the main flow is diverted and dammed by the same, whereby a static pressure is increased in the area of an exit of the leakage flow from the flow area. A pressure difference between the downstream pressure side and the upstream suction side of the blade leaf is thus reduced, which in turn results in a decreased mass flow flowing through the flow area.

The same effect can also be achieved by placing the edge area of the platform, which projects into the annular channel with respect to the rectilinear connection of the two reference points, in a rear area of the platform with respect to the axial direction of the stator device. In this manner, during operation of the stator device, a static pressure is reduced in the area of an entrance of the leakage flow into the flow area, since the main flow is deflected by the edge area of the platform that projects into the annular channel, and in this way the static pressure is transformed into a dynamic pressure. Also thanks to this measure, a pressure difference between the entrance of the leakage flow into the flow area and an exit of the leakage flow from the flow area is reduced.

It is particularly advantageous if the front edge area of the platform in the axial direction of the stator device as well as the rear edge area of the platform in the axial direction of the stator device project into the annular channel, since hereby a static pressure in the area of the front edge area of the platform is increased and a static pressure in the area of the rear edge area of the platform is reduced. Due to the overall reduction of the pressure gradient between the front edge area of the platform and the rear edge area of the platform, only an especially low mass flow is thus guided through the flow area during operation of the stator device, which is why the level of efficiency of a continuous-flow machine that is embodied with the stator device is advantageously high.

In an advantageous embodiment of the stator device according to the invention, the platform of the guide vane is arranged in an inner and/or outer edge area of the blade leaf with respect to the radial direction of the stator device. A mass flow flowing through the flow area can be reduced by means of the edge area of the platform that is projecting into the annular channel independently of in which of the radially oriented edge areas of the annular channel the platform is arranged.

The pressure conditions in the area of the edge area of the platform that extends into the annular channel are improved in a particularly advantageous manner, if the edge area of the platform that projects into the annular channel extends into the annular channel with respect to the rectilinear connection of the reference points by at least 0.3%, in particular between 0.5% and 2.5% to 4%, preferably between 0.7% and 1.5% of an extension of the annular channel in the radial direction of the stator device in the area of the edge area, i.e. perpendicular to a width of the annular channel that is arranged in the axial direction of the stator device.

In order to be able to influence the pressure conditions in the area of the edge area of the platform that projects into the annular channel to a desired degree, it is provided in an advantageous embodiment of the stator device according to the invention that the edge area of the platform that extends into the annular channel in a front or a rear area in the axial direction of the stator device is embodied with a round.

If the edge area of the platform that extends into the annular channel is embodied with a projection, with the platform having a larger extension in the axial direction of the stator device in an area that is facing towards the annular channel than in an area that is facing away from the surface of the annular channel, and if the projection is arranged in a rear edge area of the platform in the axial direction of the stator device, the leakage flow, after having been conducted out from the flow area, is deflected in the area of the projection and is accelerated around the same, so that the main flow is advantageously influenced to a reduced degree by the leakage flow that is conducted out from the flow area. By arranging the projection in a front edge area of the platform in the axial direction of the stator device, a static pressure in the area of the front edge area of the platform is advantageously further increased during operation of the stator device. Here, the projection can in particular be embodied in a nose-shaped manner.

In an advantageous further development of the stator device, the projection at least in certain areas overlaps the housing appliance that is adjacent to the platform in the axial direction of the stator device. If the projection is arranged in the front edge area in the axial direction of the stator device, a pressure in the area of the suction side of the guide vane is advantageously strongly increased through a strong blockage effect of the projection during operation of the stator device, whereby a mass flow that is conveyed through the flow area is advantageously low.

In an advantageous embodiment of the invention, the edge area of the platform that projects into the annular channel with respect to the rectilinear connection of the two reference points extends across an angular range for example larger than 20°, in particular larger than 30°, with respect to a circumferential direction of the guide vane. Here, a transition of the edge area that projects into the annular channel to those areas of the platform that do not project into the annular channel is preferably embodied in a smooth manner, i.e. without a ledge. It is particularly advantageous if the edge area of the platform that projects into the annular channel runs completely around the platform.

What is further proposed is a blade wheel device with such a stator device and a rotor device, wherein the suction appliance is connected to a conduit area via which working fluid can be supplied to the rotor device during operation of the stator device.

A level of efficiency of a continuous-flow machine that is embodied with such a blade wheel device is advantageously high, since in addition to an improvement of the level of efficiency due to the reduction of the mass flow that is introduced in the flow area into the main flow to the extent as it has been more closely described above, the mass flow that is extracted from the leakage flow during operation of the stator device itself is used for improving the level of efficiency of the continuous-flow machine. This is thanks to the fact that, due to the introduction of the mass flow in particular in the area of rotor tips of rotor blade appliances of the rotor device, turbulences that occur in this area are reduced. The mass flow of the stator device that is extracted from the leakage flow by the suction appliance is preferably supplied to the rotor device that is located directly in front of the blade wheel device of the stator device in the axial direction. What is thus present is an optimum of suctioned-off mass flow, in which a maximal improvement of the level of efficiency is achieved.

Further, with the solution according to the invention, the surge line of a blade wheel device that is embodied as a compressor is also increased, so that a blade number of the compressor can be reduced or a stage pressure ratio can be increased, for example.

In an advantageous further development of the blade wheel device, the conduit area has at least one nozzle via which a working fluid can be supplied to the rotor device during operation of the blade wheel device. Here, multiple nozzles that are arranged so as to be distributed in the circumferential direction of the blade wheel device, or one or multiple nozzles that extend across a larger angular range of for example larger than 45°, or a completely circumferential nozzle can be provided.

As an alternative to this, it can also be provided that the mass flow that is extracted from the leakage flow in the area of the stator device via the suction appliance is used for other application cases. For example, it can be provided that the mass flow is used for air conditioning the aircraft cabin, for cooling a turbine, for axial force compensation of an engine's bearing, for sealing the storage areas, for de-icing the wings of an airplane or a engine nacelle, or for stability-controlling a compressor. Further, it can also be provided that the mass flow that is extracted from the leakage flow is introduced into the bypass channel of an engine.

The features that are specified in the patent claims as well as the features that are specified in the following exemplary embodiments of the stator device according to the invention are suitable to further develop the subject matter according to the invention respectively on their own or in any combination with each other.

Other advantages and advantageous embodiment forms of a stator device according to the invention follow from the patent claims and the exemplary embodiments that are described in principle in the following by referring to the drawings, wherein, with a view to clarity, the same reference signs are respectively used for structurally and functionally identical structural components.

Herein:

FIG. 1 shows a strongly schematized longitudinal section view of a section of a jet engine, wherein a compressor with multiple rotor devices and stator devices is shown that respectively have blades that project into a core flow channel;

FIG. 2a shows a section of a guide vane of a stator device according to FIG. 1, wherein a platform connected to a blade leaf can be seen and flow lines that are occurring during operation of the jet engine are shown in an exemplary manner, and wherein the platform of the guide vane is separated by a housing appliance from a platform of a guide vane that is adjacent in the circumferential direction;

Figure 1:
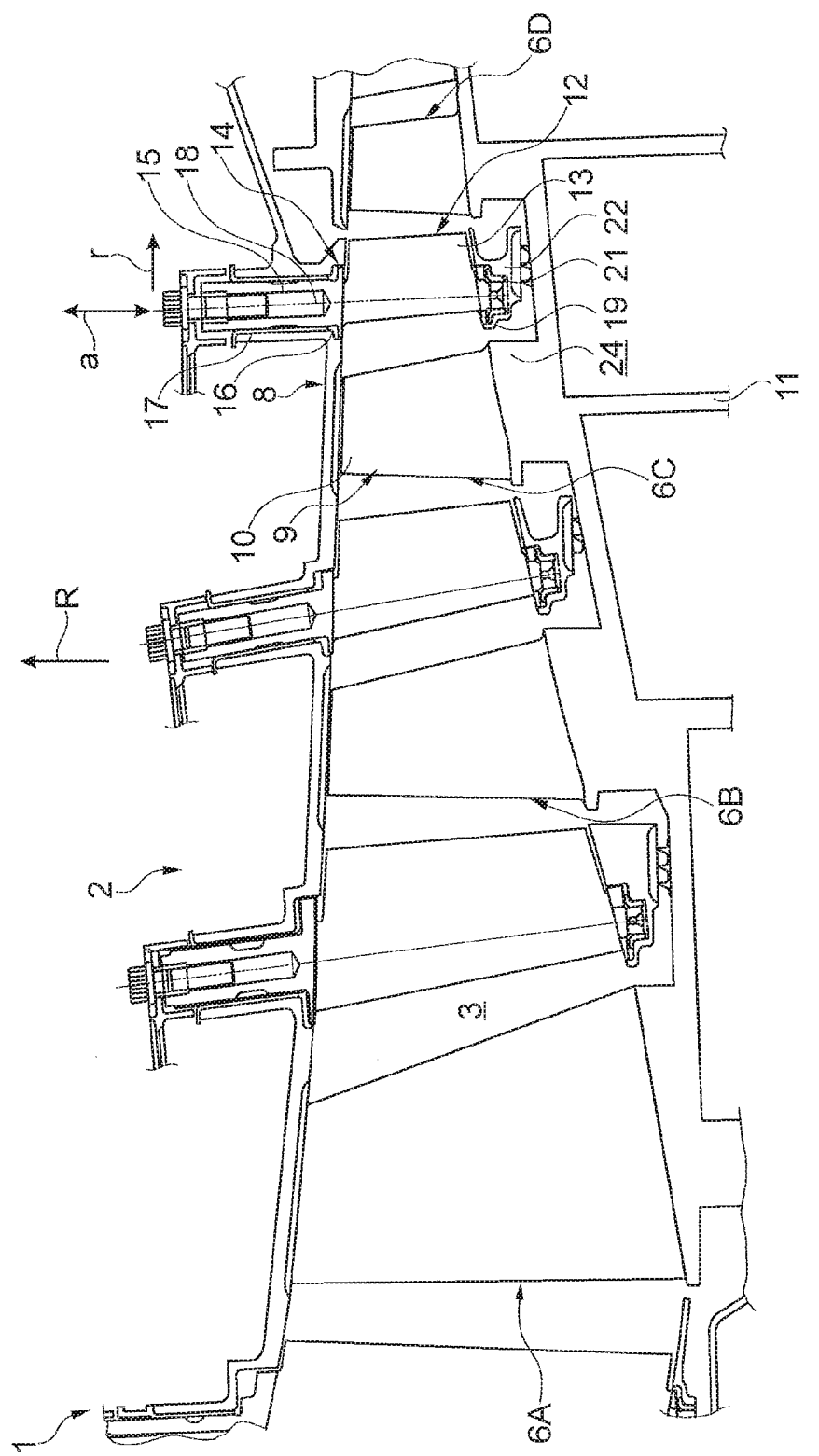
Figure 15:
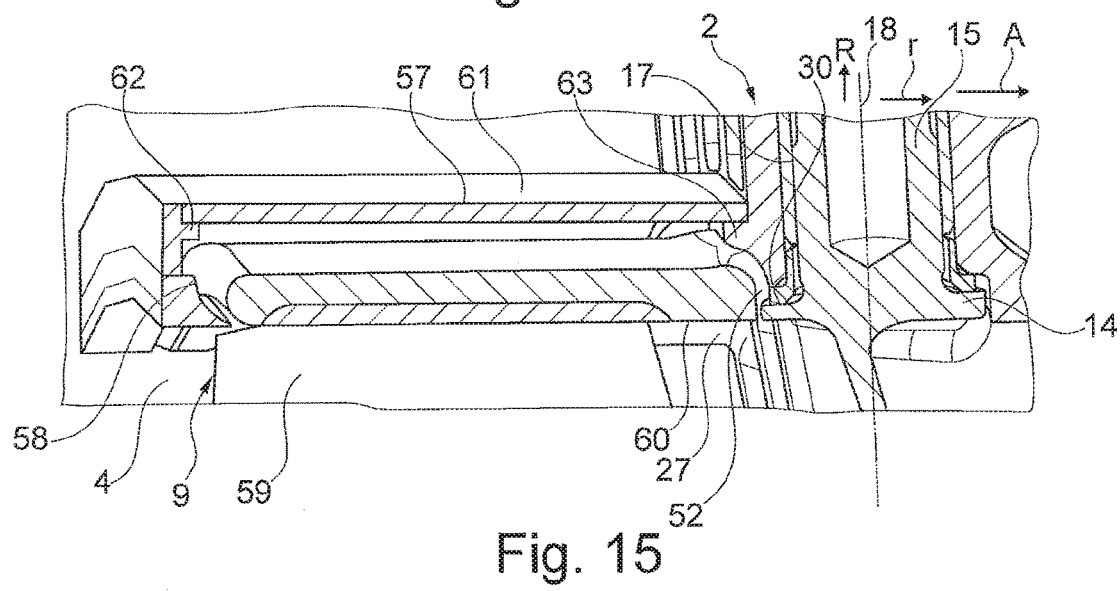
Figure 16:
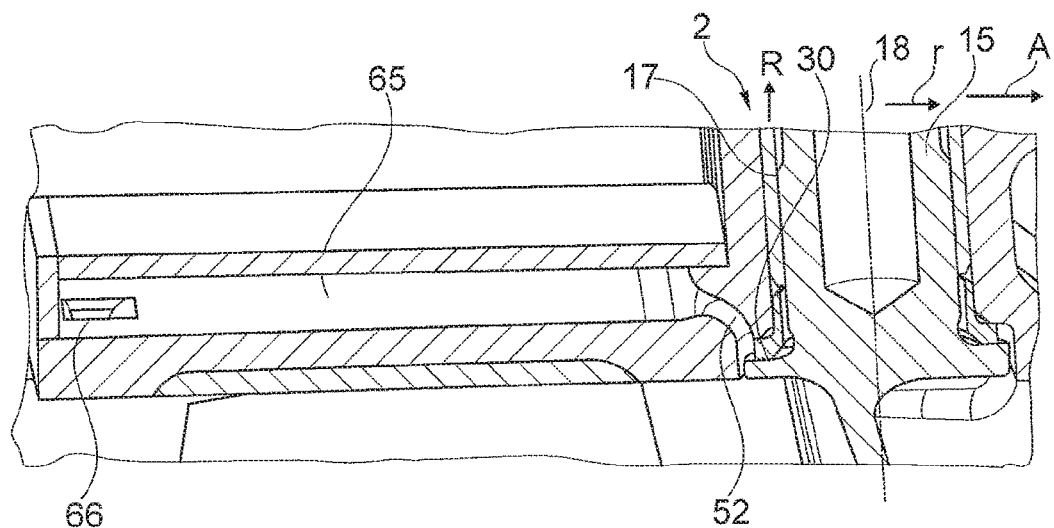
Figure 17:
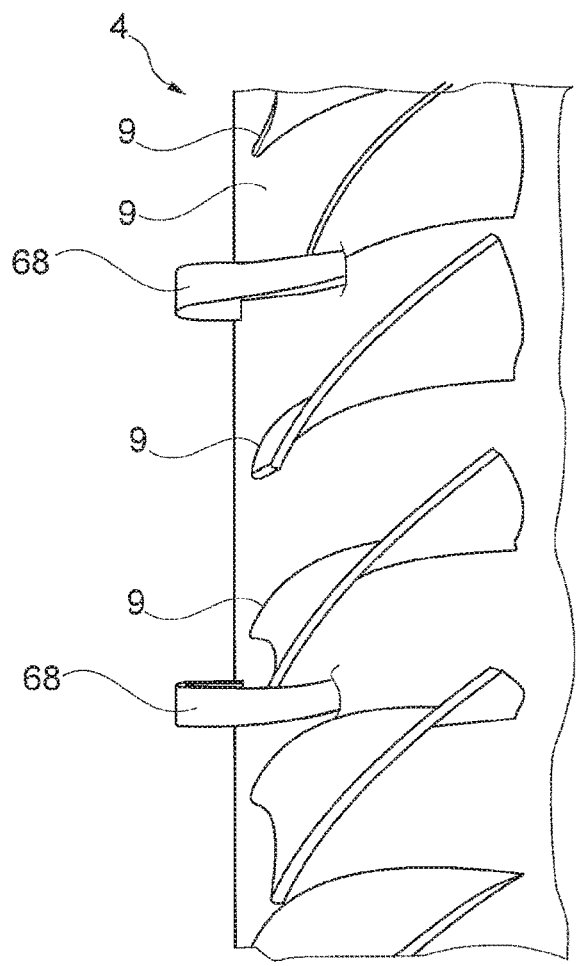
Figure 18:
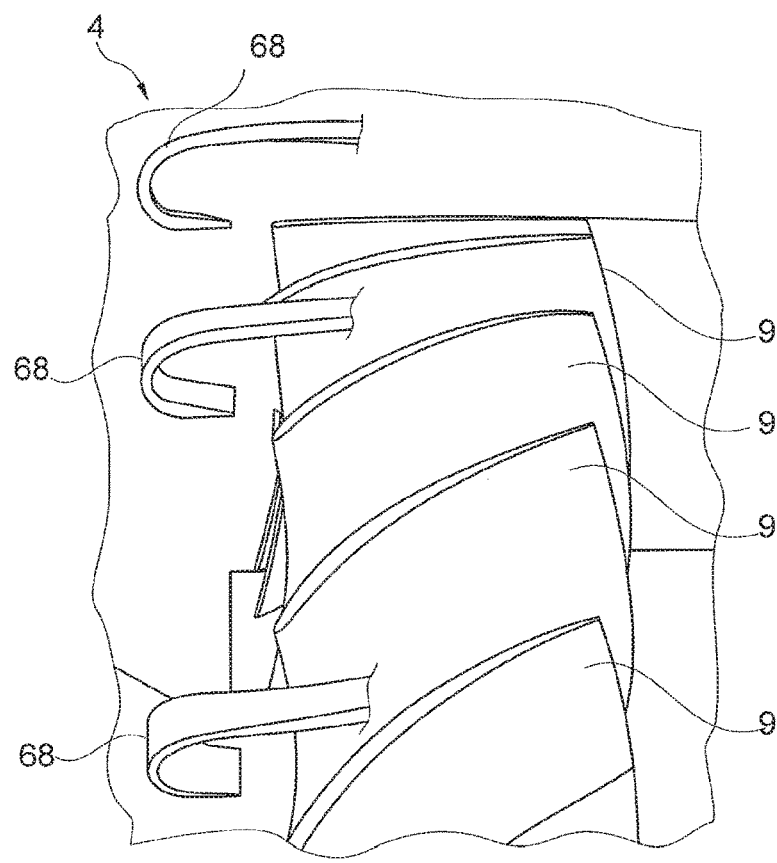
Figure 19:
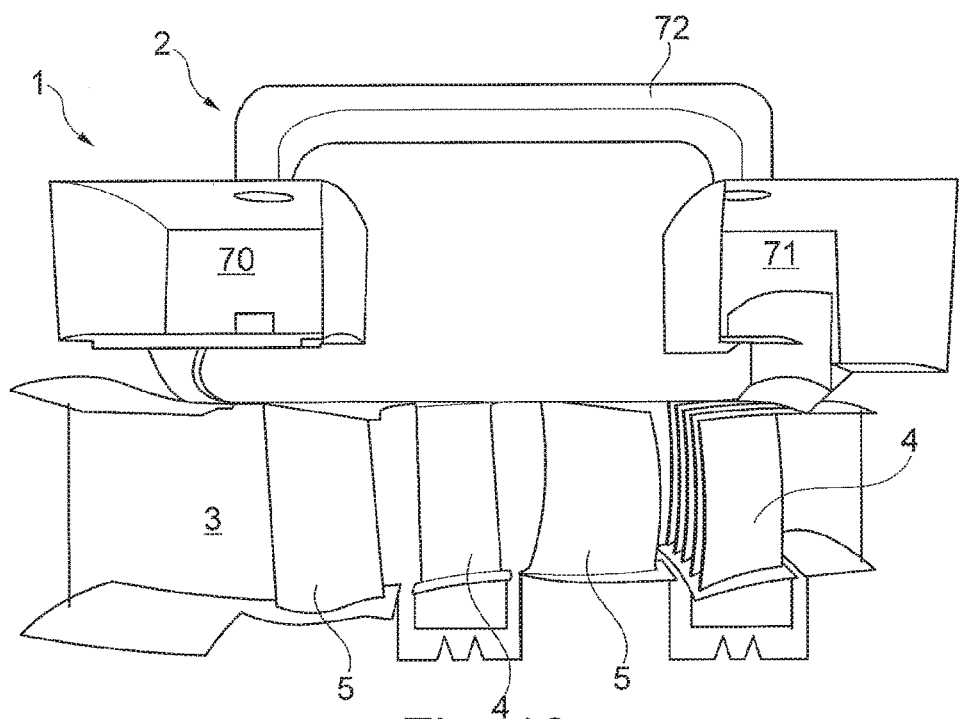
Figure 20:
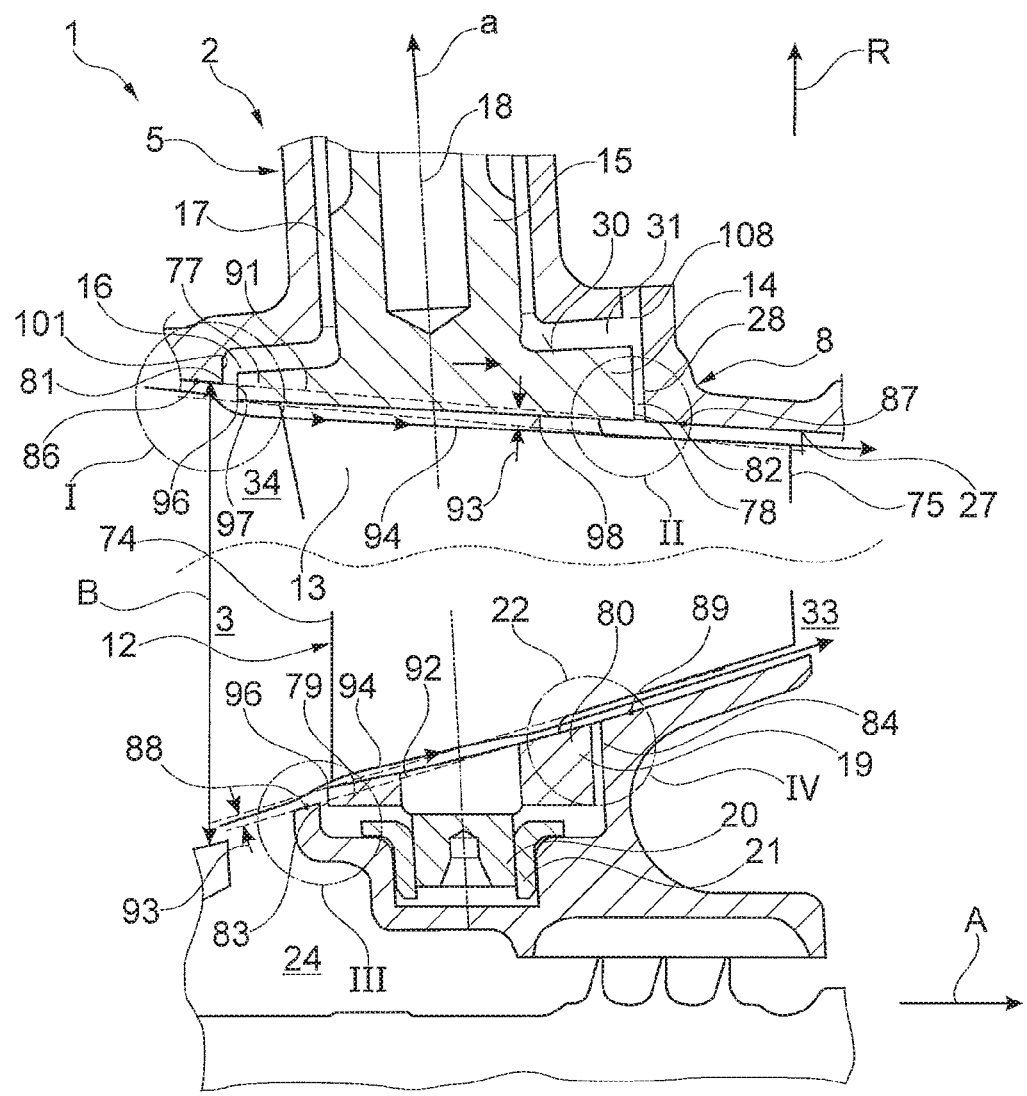

FIG. 15 show a simplified longitudinal section view of a section of the jet engine according to FIG. 1, wherein a stator device and a rotor device that is located in front of the stator device in the axial direction of the jet engine can be seen, and wherein a conduit area is provided, which on the one hand is connected to a suction appliance and on the other hand has one nozzle-like opening in the area of the rotor device;

FIG. 16 shows a longitudinal section view of the jet engine corresponding to FIG. 15, wherein an alternatively embodied nozzle-like opening is shown;

FIG. 17 shows a simplified three-dimensional rendering of an alternative embodiment of conduit areas, wherein the housing appliance is not shown in any more detail;

FIG. 18 shows a further three-dimensional view of the conduit area of FIG. 17 from another perspective;

FIG. 19 shows a strongly simplified view of the compressor of the jet engine of FIG. 1, wherein two spaces that are connected via a conduit area can be seen;

FIG. 20 shows a strongly simplified longitudinal section rendering through a guide vane of the stator device of FIG. 1, from which a front edge area, as seen in the axial direction, projects into the core flow channel; and FIGS. 21-28 show various embodiments of the sections I and II of FIG. 20, which respectively show differently embodied platforms of the guide vane.

FIG. 1 shows a section of a continuous-flow machine, which in the present case is embodied as a jet engine 1, but which in an alternative embodiment can also be a stationary gas turbine. In the section, an annular channel or core flow channel 3 of the jet engine 1 is shown in the area of a blade wheel device that is embodied as a high-pressure compressor 2, wherein different stages 6A, 6B, 6C, 6D of the high-pressure compressor 2 can be seen, which respectively consist of a rotor device 4 and a stator device 5 that is arranged downstream of the rotor device 4 in the axial direction A of the jet engine 1.

In the following, the rotor device 4 and the stator device 5 of the third stage 6C of the high-pressure compressor 2 are described in more detail, wherein the rotor devices 4 and the stator devices 5 of the other stages 6A, 6B, 6D are embodied in a comparable manner.

The rotor device 4 has a plurality of rotor blade appliances 9 that are embodied with blade leafs 10 and that are operatively connected to a disc wheel 11 in a circumferentially distributed manner and rotate around a central axis of the jet engine 1 during operation of the jet engine 1. In contrast, the stator device 5 is embodied with a plurality of guide vanes 12 that also respectively have a blade leaf 13, wherein the guide vanes 12, which are respectively embodied in a structurally identical manner, are arranged in a circumferentially distributed manner in the radial direction R of the jet engine 1 at the outside of a housing appliance 8.

In the radial direction R of the jet engine 1 outward, the blade leafs 13 of the guide vanes 12 respectively adjoin a platform 14 or a so-called penny, wherein the platforms 14 delimit the core flow channel 3 in the radial direction R of the jet engine 1 at least in certain areas. Outwards in the radial direction R of the jet engine 1, the platforms 14 are respectively connected to a spindle-shaped area 15, and in the present case are embodied so as to be integral with the same, wherein the platforms 14 have a larger cross-section with respect to a middle axis 18 of the spindle-shaped area 15 than the spindle-shaped area 15. With the platforms 14 and the spindle-shaped areas 15, the guide vanes 12 are arranged inside recesses 16 of the housing appliance 8, wherein the spindle-shaped areas 15 are mounted inside the recesses 16 via sockets 17.

The guide vanes 12 are arranged in the recesses 16 of the housing appliance 8 in the known manner so as to be twistable around the middle axis 18 of the spindle-shaped area 15, wherein the guide vanes 12 can for example be twisted via the spindle-shaped areas 15 by an angle of between 18° and 45° with respect to the housing appliance 8.

A platform 19 is also provided at an inner side of the blade leaf 13, with respect to the radial direction R of the jet engine 1 or of the stator device 5, and is embodied in an analogous manner to the platform 14 with a spindle-shaped area 20, delimiting the core flow channel 3 at least in certain areas in the radial direction R of the jet engine 1. Via the spindle-shaped area 20, the guide vane 12 is mounted, again via a socket 21, inside a housing part 22, a so-called shroud, wherein the guide vane 12 is mounted so as to be rotatable around the middle axis 18 with respect to the housing part 22. Here, the entire housing part 22 is arranged inside a recess 24, which is formed by two rotor devices 4 that are adjacent to each other in the axial direction A of the jet engine 1 or of the stator device 5. During operation of the jet engine 1, the area of the rotor device 4 that is facing towards the housing part 22 rotates around the engine axis, while the housing part 22 is static with respect to the engine axis.

Figure 2A:
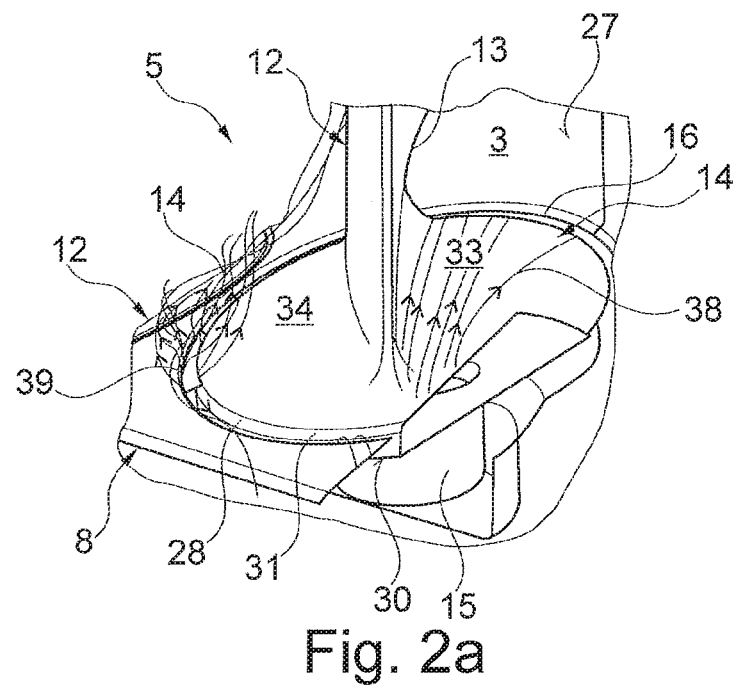
FIG. 2b shows a rendering of the guide vane that corresponds to FIG. 2a, wherein the housing appliance has a recess in an area of the platforms of guide vanes that are adjacent to each other in the circumferential direction and that are facing each other.

FIG. 2a shows the platform 14 and the spindle-shaped area 14 of a guide vane 12, wherein it can be seen that the platform 14, which is embodied with a circular cross-section, is mounted in the recess 16, which is also circular and concentric to the middle axis 18. Here, a gap 28 is present between the platform 14 and the housing appliance 8, in the area of a surface 27 of the core flow channel 3, running around the middle axis 18 in the radial direction r and extending from the surface 27 of the core flow channel 3 outwards into the axial direction a of the middle axis 18.

Figure 2B:
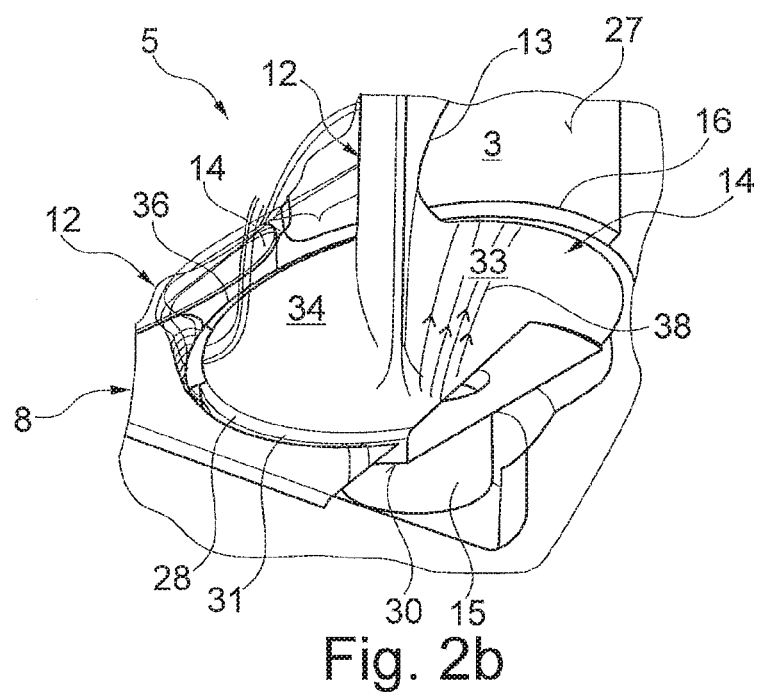

The embodiment shown in FIG. 2b differs from this in that the housing appliance 8 has a recess 36 in a facing area of the guide vanes 12 that are adjacent to each other in the circumferential direction U of the central axis, so that in this area the gap 28 is formed by the platforms 14 of the guide vanes 12. Since the embodiments of FIG. 2a and FIG. 2b do not differ from each other in any other way, the embodiment that is shown in FIG. 2a is described as representative for the embodiment shown in FIG. 2b in the following.

What can be further gathered from FIG. 2a is that a surface 30 of the platform 14 that is facing away from the core flow channel 3 is arranged at a distance from the housing appliance 8 in the radial direction R of the jet engine 1. This distance and the gap 28 form a flow area 31.

During operation of the jet engine 1, a pressure of a working fluid, in this case air, increases in the area of the high-pressure compressor 2 in the core flow channel 3 in the axial direction A of the jet engine 1 in flow direction, so that a pressure of a main flow that flows through the core flow channel 3 on a downstream pressure side 33 of the blade leaf 13 of the guide vane 12 is higher than at an upstream suction side 34 of the blade leaf 13. Due to these pressure conditions, a part of the main flow flows as a leakage flow from the pressure side 33 of the blade leaf 13 through the flow area 31 to the suction side 34 of the blade leaf 13 during operation of the jet engine 1. Here, in the area of the pressure side 33, the leakage flow is guided through the gap 28 and via the surface 30 that is facing away from the core flow channel 3 to the gap 28 in the area of the suction side 34. The leakage flow that occurs during operation is shown in FIG. 2a and FIG. 2b in an exemplary manner by the flow lines 38, wherein in the present case only those flow lines 38 that exit the gap 28 through the area 39 are shown.

The inflow of the leakage flow in the area of the suction side 34 of the blade leaf 10 into the main flow leads to considerable losses of the jet engine 1, since a velocity of the main flow in this area is reduced through the leakage flow in an undesired manner and a so-called blockage or loss area is created.

Figure 3:
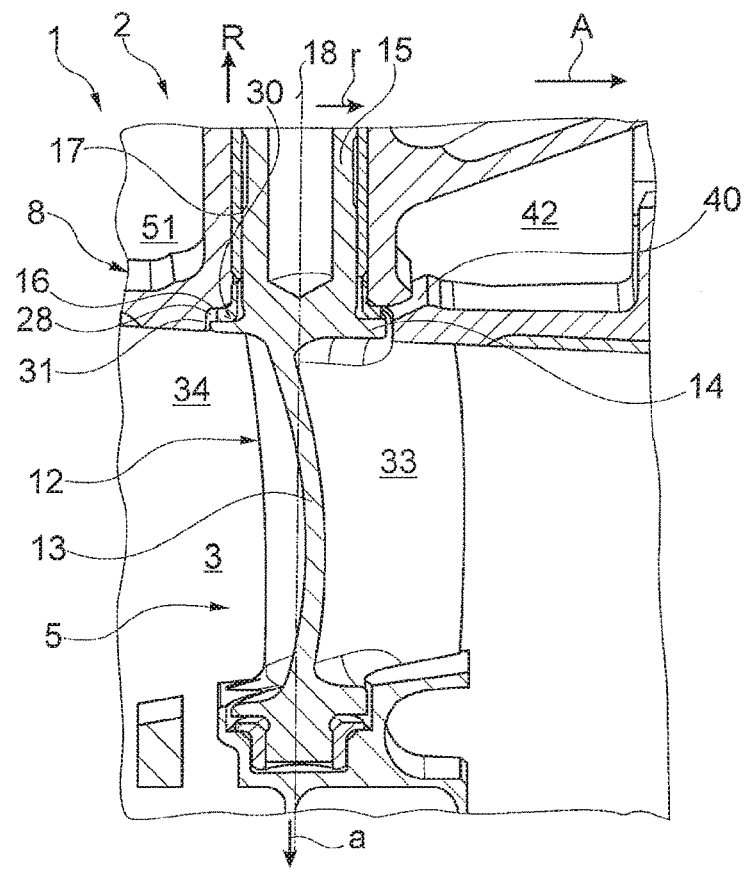
FIG. 3 shows a longitudinal section rendering through a stator device of FIG. 1, wherein a first embodiment form of a suction appliance is shown which adjoins a flow area of the guide vane in the area of a pressure side of the blade leaf.
Figure 4:
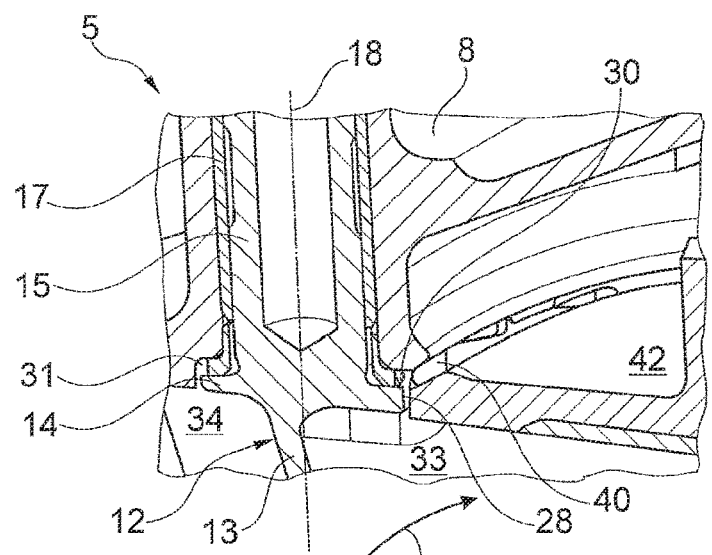
FIG. 4 shows a diagonal back view onto the longitudinal section rendering of FIG. 3.
Figure 5:
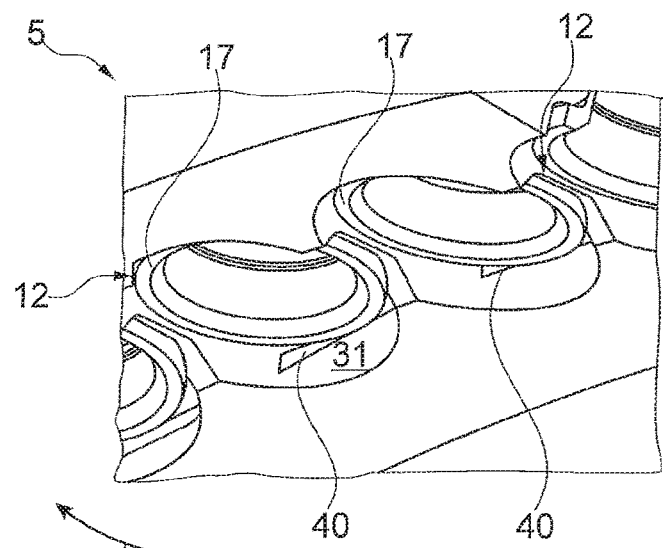
FIG. 5 shows a simplified three-dimensional view of the stator device according to FIG. 3 and FIG. 4 from radially inside, wherein the housing appliance can be seen in the area of the guide vanes without the guide vanes of the stator device.

In order to reduce a mass flow of the leakage flow that is introduced into the main flow on the suction side 34 of the blade leaf 13 during operation of the jet engine 1, a suction appliance 40 is provided according to FIG. 3 to FIG. 5 that directly abuts the flow area 31 in the area of a side that is facing towards the pressure side 33 of the blade leaf 13. According to FIG. 3, in a transitional area, the suction appliance 40 opens into the flow area 31, in which the gap 28 is connected to the surface 30 of the platform 14. In the present case, the suction appliance 40 forms a channel that has an angle of respectively approximately 45° with respect to the radial direction R and the axial direction A of the jet engine 1. With an end that is facing away from the flow area 31, the suction appliance 40 opens into a space 42 or a plenum, wherein the space 42 is separated from the core flow channel 3 by the housing appliance 8. The space 42 is arranged in the radial direction R of the jet engine 1 outside of the core flow channel 3 and in the axial direction A of the jet engine 1 downstream of the guide vanes 12. In the present case, a cross-section of the suction appliance 40 that is embodied in a channel-shaped manner is continuously enlarged in the direction of the space 42, starting from the flow area 31.

As can in particular be seen from FIG. 4, the suction appliance 40 extends in the circumferential direction U of the jet engine 1 in a completely circumferential manner, so that the flow areas 31 of all guide vanes 12 of the stator device 5 are connected to each other and to the space 42 via the suction appliance 40. In FIG. 5, this can also be seen from another perspective, wherein the guide vanes 12 are not shown in this rendering. With respect to the circumferential direction u of the middle axis 18 of the spindle-shaped area 15, the suction appliance 40 is connected to the flow area 31 via an angular range which in the present case is approximately 45°, so that a connection of the suction appliance 40 to the flow area 31 is also ensured if a guide vane 12 is in the respective end position.

In the following, further embodiment variants of the suction appliance 40 are described, wherein only the differences to the suction appliance 40 are described in more detail.

Figure 6:
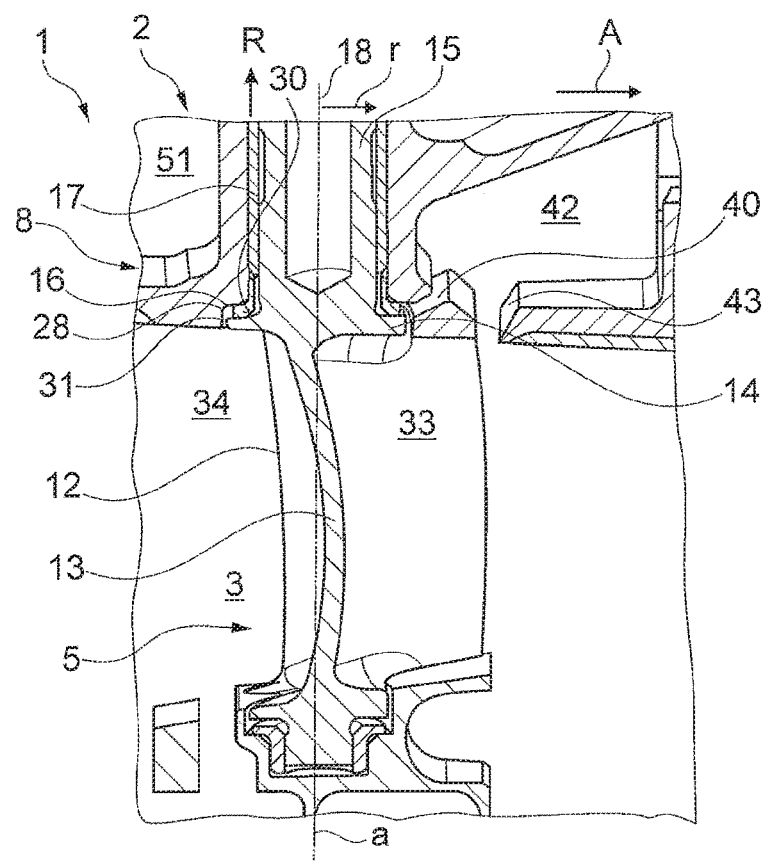
FIGS. 6-9 show longitudinal section renderings corresponding to FIG. 3 through the stator device of FIG. 1, wherein further embodiment forms of the suction appliance are shown.

The embodiment according to FIG. 6 differs from the embodiment according to FIG. 3 to FIG. 5 in that the housing appliance 8 has a recess 43 downstream of the gap 28 in the area of the pressure side 33 of the blade leaf 13, via which bleed air is additionally extracted from the main flow. The bleed air that is extracted via the recess 43 is also supplied to the space 42.

Figure 7:
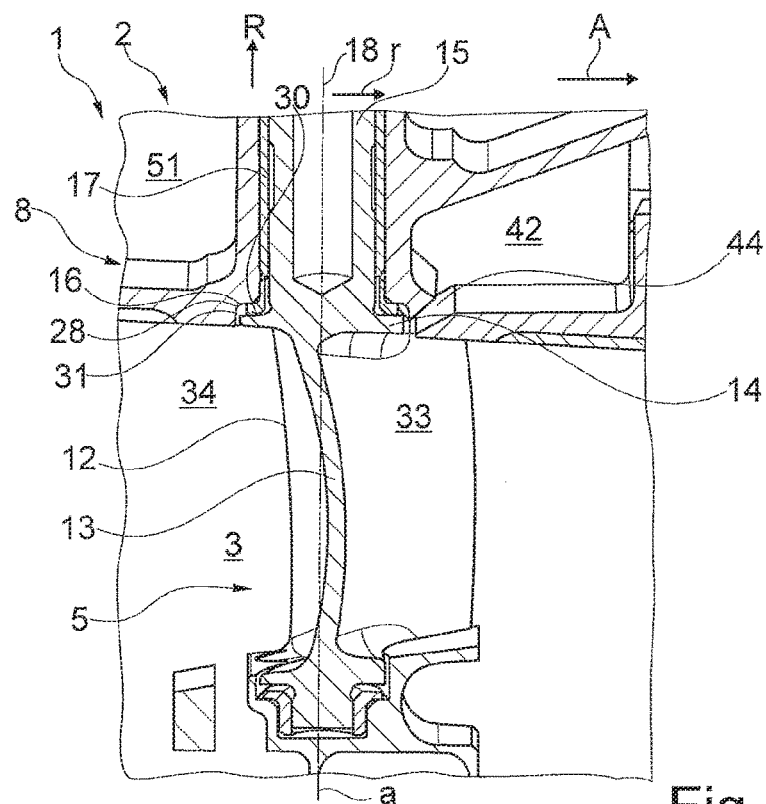

As an alternative design to the suction appliance 40, FIG. 7 shows the suction appliance 44. The suction appliance 44 differs from the suction appliance 40 in that the suction appliance 44 is directly adjacent to the core flow channel 3 in the area of the gap 28 on the pressure side 33 of the blade leaf 13, wherein the suction appliance 44 extends from the core flow channel 3 again substantially at an angle of 45° with respect to the radial direction R as well as to the axial direction A of the jet engine 1 inside the housing appliance and opens into space 42 in a manner comparable to suction appliance 40. Here, too, a cross-section of the channel-shaped suction appliance 44 continuously becomes larger starting from the flow area 31.

Figure 8:
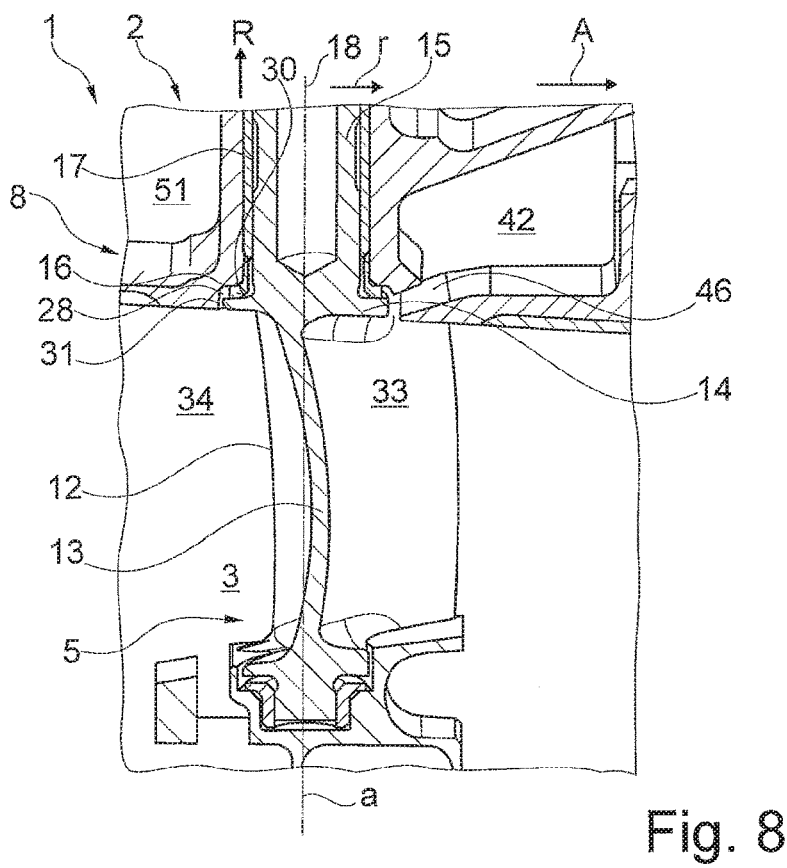

In an analogous manner to the suction appliance 44, the suction appliance 46 shown in FIG. 8 also directly adjoins the core flow channel 3, wherein the suction appliance that is embodied in a channel-shaped manner has an angle of approximately 30° with respect to the axial direction A of the jet engine 1 and a flow cross-section that is enlarged with respect to the suction appliance 44. In addition, in the present case the flow cross-section of the suction appliance 46 is substantially constant from the flow area 31 all the way up to the space 42.

Figure 9:
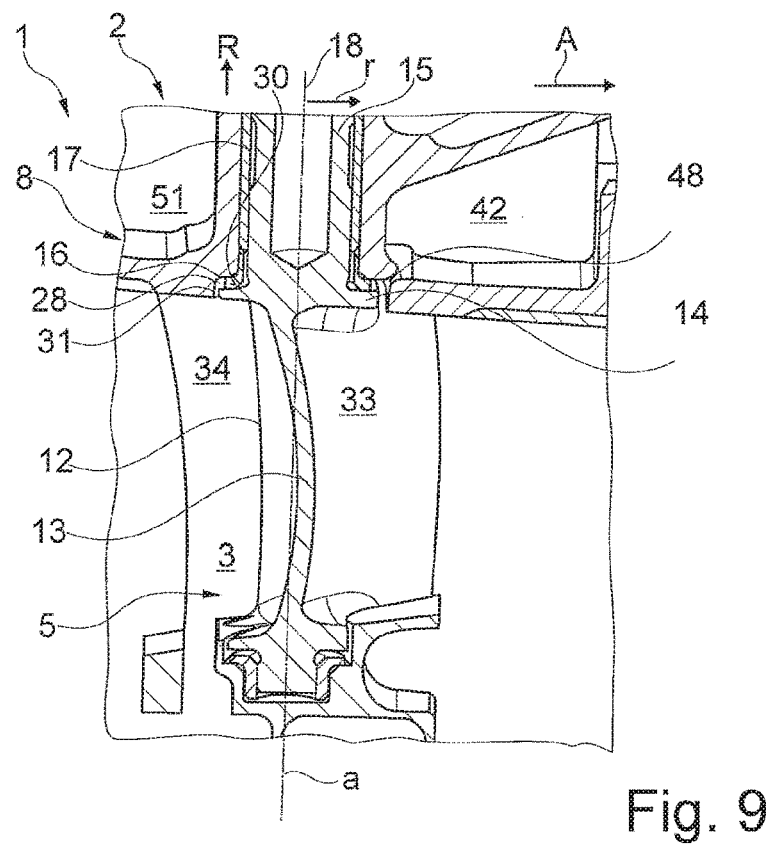

In the embodiment according to FIG. 9, the suction appliance 48 extends starting from the gap 28 in the area of the pressure side 33 of the blade leaf 13 substantially outwards in the radial direction R of the jet engine 1 and opens directly into the space 42. In contrast to the previously described suction appliances 40, 44, 46, the suction appliance 48 does not extend in the circumferential direction U of the jet engine 1 in a circumferential manner, but is arranged in a manner substantially concentric to the middle axis 18 of the spindle-shaped area 15, extending around the middle axis 18 over an angular range of for example 45°. Thus, in this embodiment, a separate suction appliance 48 is assigned to each of the guide vanes 12 of the stator device 5, which are respectively connected to the space 42.

Figure 10:
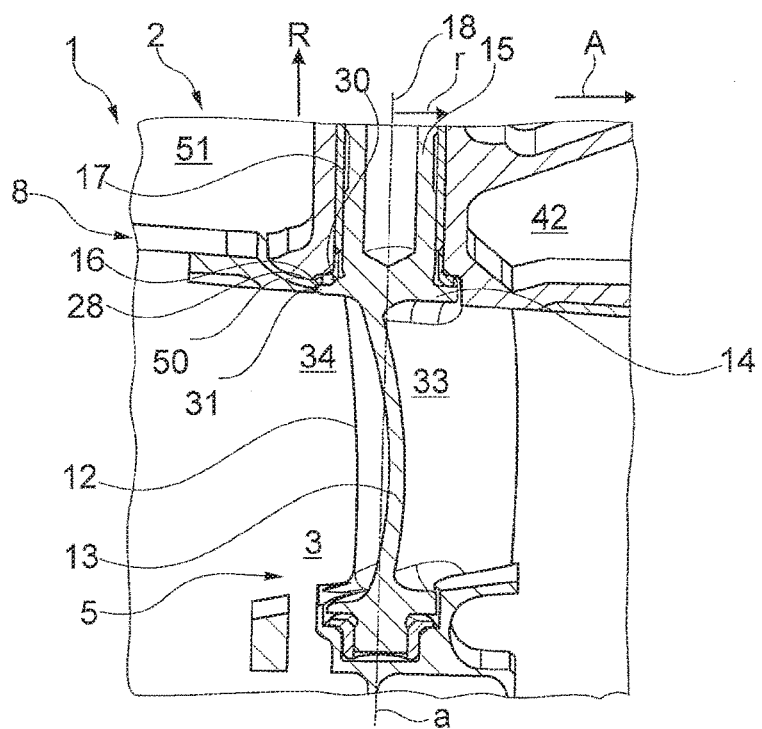
FIGS. 10-12 show longitudinal section renderings corresponding to FIG. 3 through the stator device of FIG. 1, wherein further embodiment forms of the suction appliance that is arranged on a suction side of the blade leaf are shown.
Figure 11:
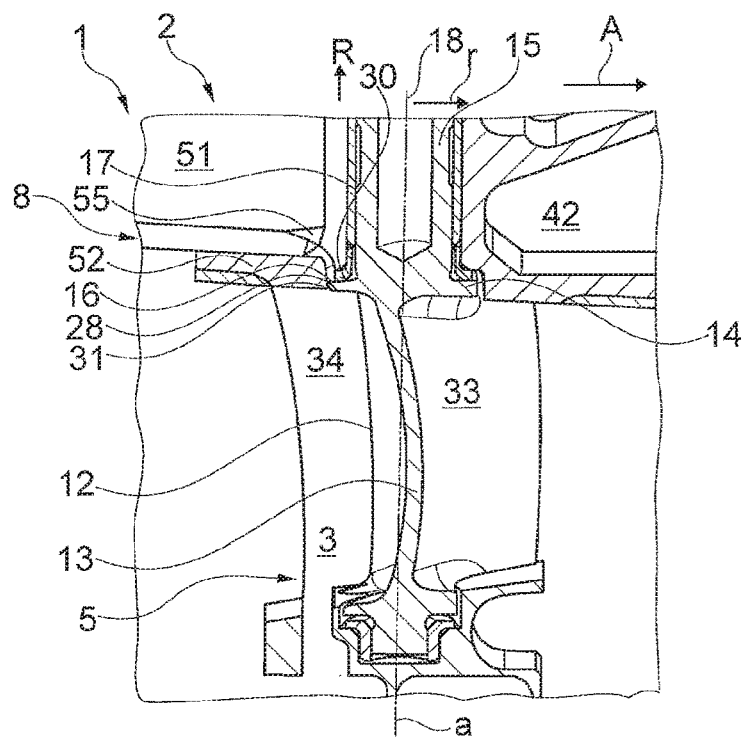
Figure 12:
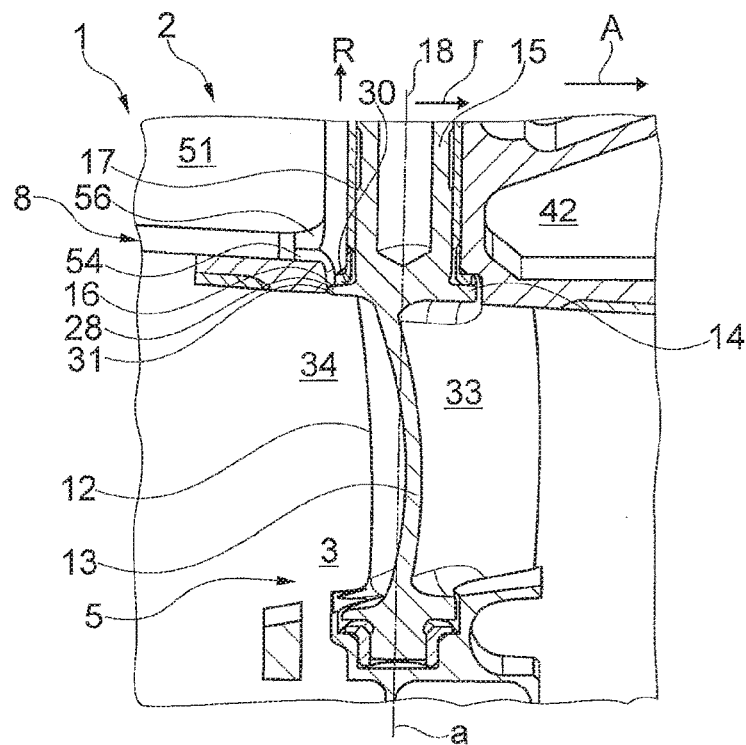

In FIG. 10 to FIG. 12, other embodiment variants of suction appliances 50, 52, 54 are shown, wherein, in contrast to the suction appliances 40, 44, 46, 48, the suction appliances 50, 52, 54 that will be described more closely below are connected to the flow area 31 in the area of the suction side 34 of the blade leaf 13. Otherwise, the suction appliances 50, 52, 54 are embodied in a manner that is substantially comparable to the suction appliances 40, 44, 46, 48.

The suction appliance 50 according to FIG. 10 abuts the flow area 31 in an area that is facing away from the core flow channel 3, and from here extends, with a bend leading outwards in the radial direction R of the jet engine 1, to a space 51 that is separated from the core flow channel 3 by the housing appliance 8 in a manner analogous the space 42, but is arranged upstream of the guide vane 12 in the axial direction A of the jet engine 1. The suction appliance 50 that is embodied in a channel-shaped manner extends so as to run along the circumferential direction U with respect to the central axis of the jet engine 1, wherein a cross-section of the suction appliance 50 is substantially constant starting from the flow area 31 up to an area in which it opens into the space 51.

The suction appliance 52 that is shown in FIG. 11 is also embodied in a channel-shaped manner and extends the gap 28 outwards in the radial direction R of the jet engine 1, wherein the suction appliance 52 opens into the space 51 via a bend with respect to the axial direction A of the jet engine 1 in the flow direction of the main flow. In the embodiment according to FIG. 11, multiple webs 55 are provided in a manner distributed in the circumferential direction U of the jet engine 1, via which parts of the housing appliance 8 are connected to each other for reasons of stability, wherein in the present case one web 55 is respectively arranged in an area between two guide vanes 12.

Figure 13:
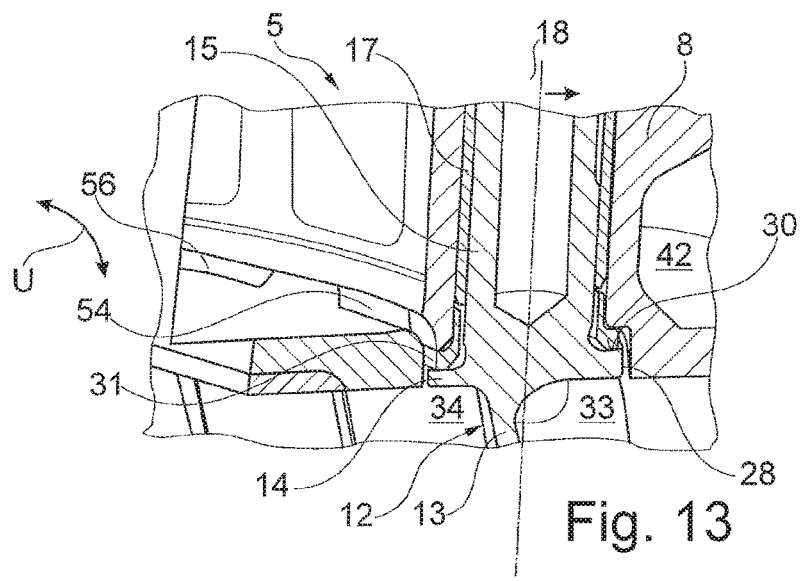
FIG. 13 shows a diagonal back view onto the longitudinal section rendering of FIG. 12.
Figure 14:
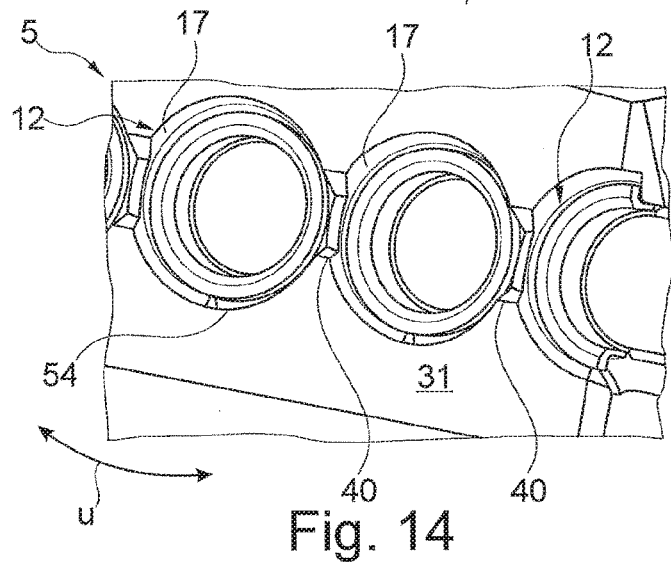
FIG. 14 shows a simplified three-dimensional view of the stator device according to FIG. 12 and FIG. 13 from radially inside, wherein the housing appliance can be seen in the area of the guide vanes without the guide vanes of the stator device.

The suction appliance 54 of FIG. 12 to FIG. 14 is embodied in a manner substantially comparable to the suction appliance 52. In particular, webs 56 are also provided in FIG. 13, having a larger extension in the circumferential direction U of the jet engine 1 as compared to the webs 55. According to the shown embodiment, the webs 55, 56 can also extend across a larger or a smaller area in the circumferential direction U of the jet engine 1 depending on the application case. As can be gathered from FIG. 14, the suction appliance 54 is connected to the flow area 31 across an angular range of approximately 30° with respect to the middle axis 18.

The mass flow that is extracted from the leakage flow during operation of the jet engine 1 via the respective suction appliance 40, 44, 46, 48, 50, 52, 54 can principally be used for different application cases, wherein the mass flow can be used in an analogous manner to bleed air that is extracted in a conventional manner from the main flow.

In FIG. 15 and FIG. 16, the mass flows that are extracted from the leakage flow via a suction appliance 52 according to FIG. 11 are supplied to the conduit area 57, which extends substantially upstream in the axial direction A of the jet engine 1 to a rotor device 4 that is located directly in front of the stator device 5. In the present case, the conduit area 57 is formed by a part 60 of the housing appliance 8 that forms the surface 27 of the core flow channel 3, and a part 61 of the housing appliance 8 that in the present case is embodied in a substantially plate-shaped manner and is connected to support elements 62, 63 of the housing appliance 8.

In the present case, the conduit area 57 extends in the circumferential direction U of the jet engine 1 in a circumferential manner. The mass flow that is guided via the conduit area 57 is conducted via a nozzle 58, which also extends in the circumferential direction U of the jet engine 1 in a circumferential manner, into the main flow in the area of the rotor tips 59 of the rotor blade appliances 9. By introducing an impulse-rich flow into the area of the rotor tips 59, a stabilizing effect for the rotor tips 59 is achieved during operation of the jet engine 1 thanks to the interaction of the mass flow introduced into the main flow with a flow present in the area of the rotor tips 59, namely in such a manner that turbulences occurring in this area are reduced.

In FIG. 16, a section of stage 6C of the high-pressure compressor 2 is shown that corresponds to that of FIG. 15. FIG. 16 differs from FIG. 15 only with respect to the embodiment of the conduit area 65, which substantially corresponds to the conduit area 57 of FIG. 15, but in contrast to the conduit area 57 has a plurality of nozzles 66 in the end area that is facing towards the rotor tips 59 that are arranged so as to be distributed around the circumference of the conduit area 65.

Another alternative is shown in FIG. 17 and FIG. 18, wherein the housing appliance 8 is not shown here. Here, a plurality of structurally identical conduit areas 68 is provided via which a mass flow that is extracted from the flow area 31 can respectively be supplied to the rotor tips 57 of the rotor blade appliances 9.

In FIG. 19, a strongly simplified section of the high-pressure compressor 2 of the jet engine 1 is shown, wherein it can be seen in the present case that in the axial direction A of the jet engine 1 two spaces 70, 71 are provided, which are connected to each other via a conduit area 72. A mass flow that is respectively extracted from the leakage flow can be supplied to the spaces 70, 71 in the manner described above via the suction appliances 40, 44, 46, 48, 50, 52, 54. Principally, any space 70, 71 can be interconnected in this way, and a mass flow can be supplied from one of these spaces 70 to a desired place of use. Via the spaces 70, 71, the mass flow that is extracted from the leakage flow via a suction appliance 40, 44, 46, 48, 50, 52, 54 can for example be conveyed upstream in the axial direction A of the jet engine 1 and for example be supplied to a rotor device 4 in the manner described above.

In FIG. 20 to FIG. 28, other possibilities of reducing a leakage flow in the flow area besides providing suction appliances 40, 44, 46, 48, 50, 52, 54 can be seen. What can be seen in the longitudinal section rendering through the middle axis 18 of the guide vane 12 according to FIG. 20, is the platform 14 with the spindle-shaped area 15 in an outer area of the core flow channel 3 in the radial direction R of the jet engine 1, as well as the platform 19 and the spindle-shaped area 20 in an inner area of the core flow channel 3 in the radial direction R of the jet engine 1, as well as the blade leaf 13 that is connecting the platforms 14 and 15. Further, a front edge 74 of the blade leaf 13, which is facing upstream in the axial direction A of the jet engine 1, and a rear edge 75 of the blade leaf 13, which is facing downstream in the axial direction A of the jet engine 1, are shown.

The platforms 14, 19 have a front edge area 77 or 79 that is oriented upstream in the axial direction A of the jet engine 1 with a front end 81 or 83, and a rear edge area 78 or 80 that is arranged downstream in the axial direction A of the jet engine 1 with a rear end 82 or 84, wherein also the flow area 31 can be seen that is formed by the gap 28 and the distance of the surface 30 of the platform 14 or 19 from the housing appliance 8 or the housing part 22 in the radial direction R of the jet engine 1. Here, the low direction of the leakage flow is indicated by arrows 94 in the area of the platform 14 as well as in the area of the platform 19.

In FIG. 20, reference points 86 or 88 upstream of the platform 14 or 19 and reference points 87 or 89 downstream of the platform 14 or 19 can be seen, wherein the reference points 86 and 88 have an upstream distance to the front end 81 or 83 that is approximately 10% of an extension of the platform 14 or 19 in the axial direction A of the jet engine 1. The reference points 87 and 89 have a downstreamside distance from the rear end 82 or 84 of the platform 14 or 19 that corresponds to approximately 10% of the extension of the platform 14 or 19 in the axial direction A of the jet engine 1. Here, the reference points 86 to 89 are respectively arranged on the surface 27 of the core flow channel 3. The reference sign 91 indicates the rectilinear connection of the reference points 86 and 87 of the platform 14, and the reference sign 92 indicates a rectilinear connection of the reference points 88 and 89 of the platform 19.

A section that shows the front edge area 77 of the platform 14 in more detail is provided with the reference sign I, while a section that comprises the rear edge area 78 of the platform 14 is provided with the reference sign II. In a comparable manner, a section comprising the front edge area 79 of the platform 19 is identified by III, and a section comprising the rear edge area 80 of the platform 19 is identified by IV.

In the embodiments according to FIG. 20 to FIG. 23, the front edge area 77 of the platform 14 projects into the core flow channel 3 in the radial direction R of the jet engine 1 by an extension 93 with respect to the connection 91, while the rear edge area 78 of the platform 14 does not project into the core flow channel 3 in the radial direction R of the jet engine 1 but is substantially arranged so as to be aligned to the housing appliance 8. The edge area 77 that is extending into the core flow channel 3 can extend in the circumferential direction u of the middle axis 18 across an angular range of for example 20° to approximately 180°, wherein in particular a smooth transition between the front edge area 77, which extends into the core flow channel 3, and the rear edge area 78 of the platform 14, which does not extend into the core flow channel 3, is provided.

Through the edge area 77 of the platform 14 that extends into the core flow channel 3, a main flow is deflected inside the core flow channel 3 in the area of the surface 27 of the housing appliance 8 according to the schematically shown streamline 95, whereby a part of the dynamic pressure in this area that is facing towards the suction side 34 of the blade leaf 13 is transformed into static pressure. The raised static pressure in this area results in a reduction of a pressure difference between a static pressure in the area of the gap 28 on the pressure side 33 of the blade leaf 13 and the static pressure in the area of the gap 28 on the suction side 34 of the blade leaf 13 as compared to an embodiment with a front edge area 77 of the platform 14 that does not project into the core flow channel 3. In this manner, the mass flow that is guided through the flow area 31 during operation of the jet engine 1 is reduced, so that a diminished mass flow enters the main flow from the flow area 31. As a result, losses in this area are in turn reduced, by which the level of efficiency of the jet engine 1 is improved.

In the embodiment according to FIG. 20, a sharp edge 96 is provided in the area of the front end 81 of the platform 14 in a transitional area between a lateral surface 97 that substantially extends in the radial direction R of the jet engine 1 and a surface 98 that is facing towards the core flow channel 3. With a view to manufacturing aspects, the edge 96 can be provided with a smaller radius.

Figure 21:
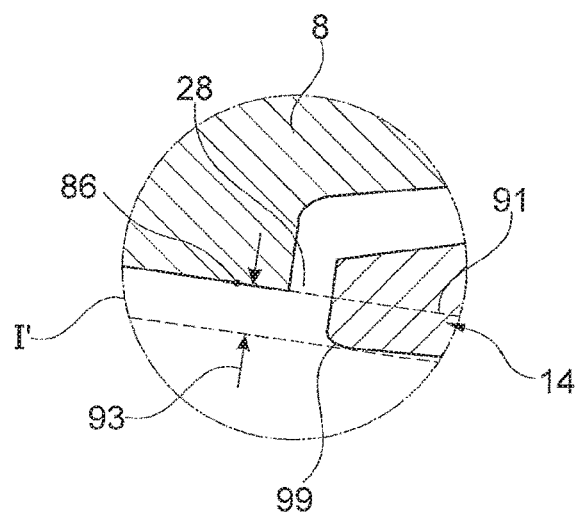

Referring to FIG. 21, a variant is shown that corresponds to the embodiment of FIG. 20, only differing from it with respect to the areas I and III of FIG. 20. As can be seen in area I', a larger radius 99 is provided in the transitional area between the lateral surface 97 that substantially extends in the radial direction R of the jet engine 1 and the surface 98 that is facing towards the core flow channel 3. The area of the platform 19 that corresponds to section III of FIG. 20 is embodied so as to be substantially horizontally mirrored with respect to section I'.

Figure 22:
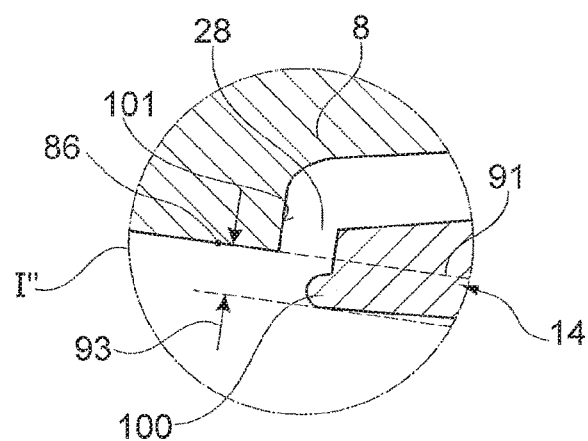

According to the embodiment according FIG. 22, the section I" is embodied alternatively to the embodiment according to FIG. 20, wherein in the transitional area between the lateral surface 97 that substantially extends in the radial direction R of the jet engine 1 and the surface 98 that is facing towards the core flow channel 3, a projection that is embodied as a nose 100 is arranged. Thus, in the axial direction A of the jet engine 1, the platform 14 has a larger extension in the area of the surface 98 than in the area of the lateral surface 97. Here, a front end 81 of the platform 14 is arranged in the area of the nose 100 with respect to the axial direction A of the jet engine 1 approximately at the level of the lateral wall 101 of the housing appliance 8 which delimitates the gap 28. It is achieved through the described embodiment of the nose 100 that the leakage flow that exits from the gap 28 in the area of the suction side 33 of the blade leaf 13 does not enter the main flow directly in the radial direction R of the jet engine 1, but is dammed up before that in the area of the nose 100. In this manner, a static pressure is further increased in this area, leading to the advantageous effects for the leakage flow as they have been described above. Further, the leakage flow that exits the gap 28 before being introduced into the main flow, is deflected around the nose 100 and accelerated, so that the leakage flow interacts with the main flow only to an advantageously small degree.

Also in the design according to FIG. 22, the area of the platform 19 that corresponds to section III of FIG. 20 is embodied so as to be substantially horizontally mirrored with respect to section I''.

Figure 23:
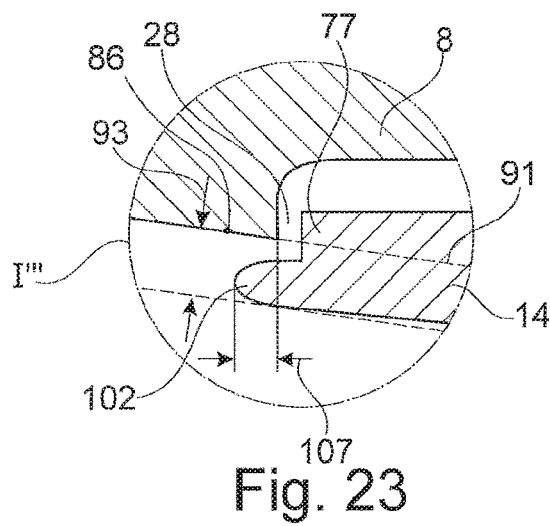

In FIG. 23, the platform 14 likewise has a projection in the front edge area 77 that is embodied as a nose 102, as shown in section I''' of FIG. 23, which is embodied in an alternative manner to the area I of FIG. 20. Here, the nose 102 is embodied in a manner that is principally comparable to that of nose 100. However, in contrast to the nose 100 according to FIG. 22, the nose 102 has a larger extension with respect to the axial direction A of the jet engine 1, so that the nose 102 overlaps the housing appliance 8 by a length 107 opposite the lateral surface 101 in the axial direction A of the jet engine 1. Through such an embodiment of the nose 102, a stronger increase in static pressure is achieved in the area of the gap 28 than is the case with nose 100. As for the design according to FIG. 23, the area of the platform 19 that corresponds to section III of FIG. 20 is again embodied so as to be substantially horizontally mirrored with respect to section I'''.

Figure 24:
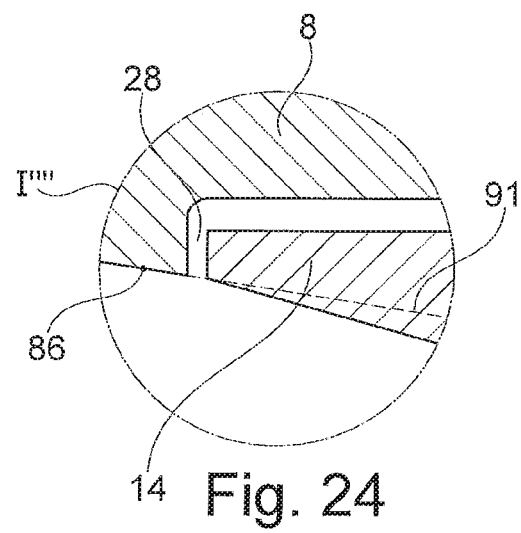

FIG. 24 shows I'''' an alternative embodiment of section I of FIG. 20, in which, in the radial direction R of the jet engine 1, the front edge area 77 of the platform 14 has an extension that substantially corresponds to the connection 91 in this area. The embodiment I'''' according to FIG. 24 can be combined with the embodiment variants II' to II'''' of the rear edge area 78 of the platform 14 that are shown in FIG. 25 to FIG. 28. In all following embodiment variants, the front edge area 79 of the platform 19 can be embodied corresponding to the section III in FIG. 20 in a horizontally mirrored manner with respect to the front edge area 77 of the platform 14. Likewise, the rear edge area 80 of the platform 19 can be embodied in a manner corresponding to section IV in FIG. 20 in a horizontally mirrored manner with respect to the rear edge area 78 of the platform 14.

According to sections II' to III'''' of FIG. 25 to FIG. 28, the rear edge area 78 of the platform 14 projects into the core flow channel 3 by an extension 110 with respect to the connection 91 in the radial direction R of the jet engine 1. The edge area that extends into the core flow channel 3 can extend in the circumferential direction u of the middle axis 18, again over an angular range of for example 20° up to approximately 180°, wherein in particular a smooth transition is provided between the edge area comprising the rear edge area 78 and extending into the core flow channel 3, and an edge area of the platform 14 comprising the front edge area 77 and not extending into the core flow channel 3.

Through the edge area 78 of the platform 14 that projects into the core flow channel 3, a main flow is deflected inside the core flow channel 3 in the area of the surface 27 of the housing appliance 8 according to the schematically shown streamline 95 by means of the rear edge area 78 that is projecting into the core flow channel 3, whereby a part of the static pressure in this area that is facing towards the pressure side 33 of the blade leaf 13 is transformed into dynamic pressure. The reduced static pressure in this area results in the reduction of a pressure difference between the static pressure in the area of the gap 28 on the pressure side 33 of the blade leaf 13 and the static pressure in the area of the gap 28 on the suction side 34 of the blade leaf 13 as compared to an embodiment with a rear edge area 78 of the platform 14 that does not project into the core flow channel 3. As a consequence the mass flow that is guided through the flow area 31 during operation of the jet engine 1 is also reduced. As due to this fact, less mass flow enters the main flow from the flow area 31, losses in this area are reduced, in turn leading to an improvement of the level of efficiency of the jet engine 1.

Figure 25:
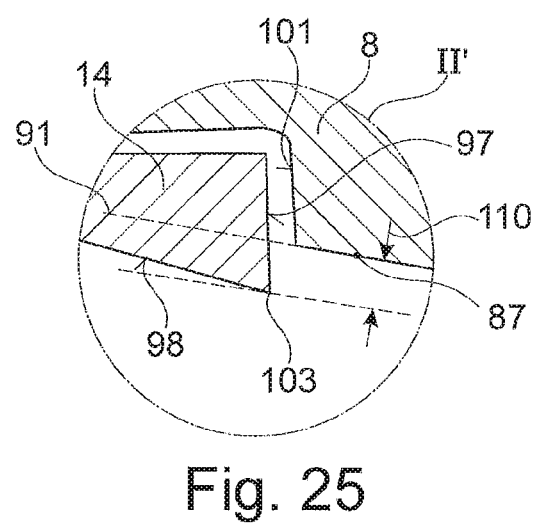

In the section II' according to FIG. 25, a sharp edge 103 is provided in a transitional area between the lateral surface 97 that substantially extends in the radial direction R of the jet engine 1 and a surface 98 that is facing towards the core flow channel 3 and that can be provided with a small radius in particular with a view to manufacturing aspects.

Figure 26:
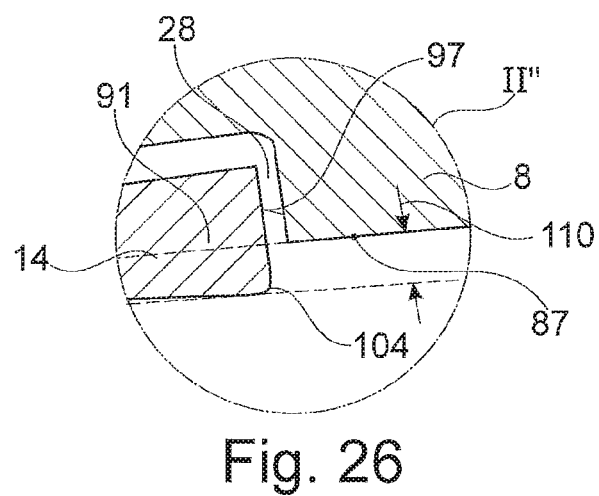

In contrast to this, in the embodiment of the area II'' according to FIG. 26, a larger radius 104 is provided in the transitional area between the lateral surface 97 that extends substantially in the radial direction R of the jet engine 1 and the surface 98 that is facing the core flow channel 3.

Figure 27:
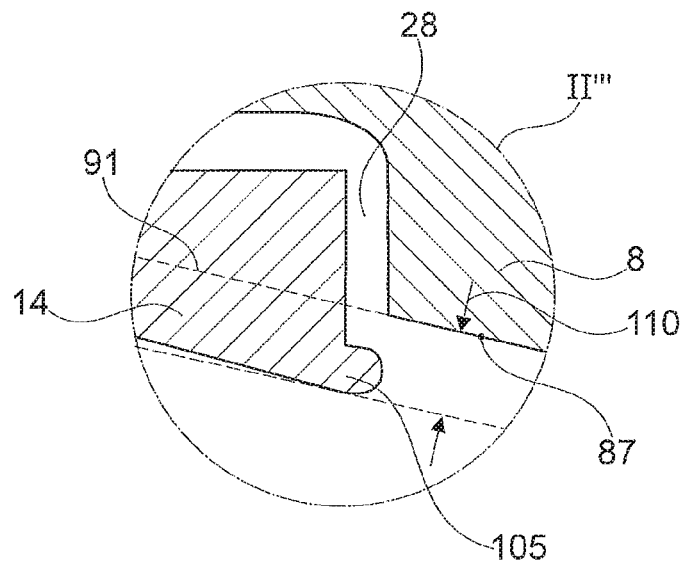
Figure 28:
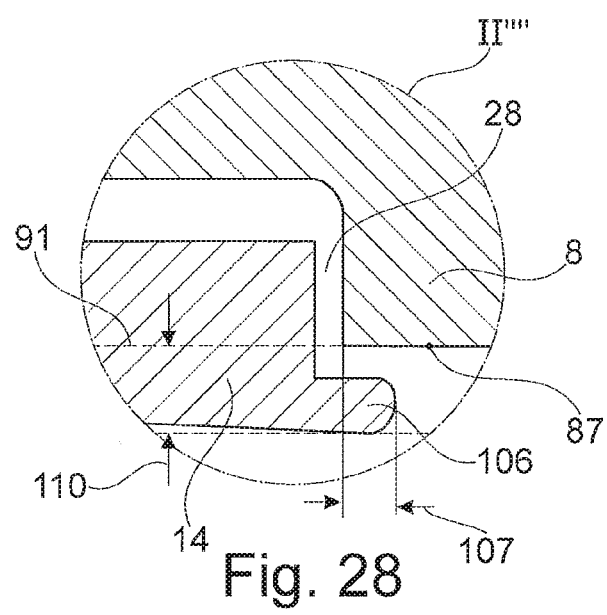

According to sections II''' according to FIG. 27 and II'''' in FIG. 28, one projection that is embodied as a nose 105 or 106 is respectively arranged in the transitional area between the lateral surface 97 that substantially extends in the radial direction R of the jet engine 1 and the surface 98 that is facing towards the core flow channel 3, wherein the respective nose 105 or 106 is embodied substantially so as to be mirror-symmetric or mirrored vertically with respect to nose 100 or nose 102.

Apart from the already described embodiment variants, in which either the front edge area 77 or 79 or the rear edge area 78 or 80 of the platform 14 or 19 extend into the core flow channel 3, it can also be provided that the front edge area 77 or 79 as well as the rear edge area 78 or 80 of the platform 14 or 19 project into the core flow channel 3 with respect to the connection 91 or 92 in the radial direction R of the jet engine 1. As a result, pressure increase occurs in the area of the gap 28 on the suction side 34 of the blade leaf 13 in the manner described more closely above, and a pressure reduction occurs in the area of the gap 28 on the pressure side 33 of the blade leaf 13 in the manner described more closely above, so that a pressure gradient from a pressure in the area of an entrance of the leakage flow into the flow area 31 to a pressure in the area of an exit of the leakage flow from the flow area 31 is further reduced. In this way, a mass flow flowing through the flow area 31 is further reduced during operation of the jet engine 1.

Principally, the platforms 14, 19 in the sections I, II, III and IV can form any combination of the embodiment variants as they have been respectively described in this context. In particular in the front edge area 77 or 79, the transitional area from the lateral surface 97 of the platform 14 to the surface 98 of the platform 14 is embodied in a manner comparable to the rear edge area 78 or 80. Here, the edge area 77, 78 of the platform 14 that projects into the core flow channel 3 or the edge area 79, 80 of the platform 19 that projects into the core flow channel 3 is preferably embodied so as to be completely circumferential in the circumferential direction u of the middle axis 18. As an alternative to this, the transitional area from the lateral surface 97 to the surface 98 of the platform can also be embodied in the front edge area 77 or 79, or differently than in the rear edge area 78 or 80.

The extension 93 in the front edge area 77 or 79 and the extension 110 in the rear edge area 78 or 80 can also have a corresponding value. As an alternative to this, one of the extensions 93 or 110 can be larger than the other extension 110 or 93.

In the present case, the extension 93 or the extension 110 of the edge area 77, 78, 79, 80 that projects into the core flow channel 3 is approximately 0.8% of the width B of the core flow channel 3 perpendicular to the axial direction A of the jet engine 1 in the area of the edge area 77, 78, 79, 80.

As shown in FIG. 20, a suction appliance 108 can adjoin the flow area 31 in the area of the pressure side 33 of the blade leaf 13 and/or in the area of the suction side 34 of the blade leaf. Principally, each of the embodiments described in FIG. 20 to FIG. 28 can be combined with one or multiple of the suction appliances 40, 44, 46, 48, 50, 52 or 54 shown in FIG. 3 to FIG. 14.

Likewise, it can be provided that the platforms 14 or 19 shown in FIG. 3 to FIG. 18 project into the core flow channel 3 according to the embodiments according to FIG. 20 to FIG. 30. Through the combination of the platform 14 that projects into the core flow channel 3 with a suction appliance 40, 44, 46, 48, 50, 52, 54, 108, a level of efficiency of the jet engine 1 is further increased in an advantageous manner, as the effect of the suction appliance 40, 44, 46, 48, 50, 52, 54, 108 is added to the effect of the platform 14, 19 that protrudes into the core flow channel.

PARTS LIST 1 continuous-flow machine; jet engine
2 blade wheel device; high-pressure compressor
3 core flow channel
4 rotor device
5 stator device
6A to 6D stages of the high-pressure compressor
8 housing appliance
9 rotor blade appliance
10 blade leaf of the rotor blade appliance
11 disc wheel
12 guide vane
13 blade leaf of the guide vane
14 platform
15 spindle-shaped area
16 recess of the housing appliance
17 socket
18 middle axis
19 platform
20 spindle-shaped area
21 socket
22 housing part
24 recess
27 surface of the core flow channel
28 gap
30 surface of the platform
31 flow area
33 pressure side of the blade leaf
34 suction side of the blade leaf
36 recess
38 flow line
39 area
40 suction appliance
42 space
43 recess
44 suction appliance
46 suction appliance
48 suction appliance
50 suction appliance
51 space
52 suction appliance
54 suction appliance
55 web
57 conduit area
58 nozzle
59 rotor tip
60 part of the housing appliance
61 part of the housing appliance
62 support element
63 support element
65 conduit area
66 nozzle
68 conduit area
70 space
71 space
72 conduit area
74 front edge of the blade leaf
75 rear edge of the blade leaf
77 front edge area of the platform
78 rear edge area of the platform
79 front edge area of the platform
80 rear edge area of the platform
81 front end of the platform
82 rear end of the platform
83 front end of the platform
84 rear end of the platform
86 to 89 reference point
91, 92 rectilinear connection
93 extension
94 arrow
95 flow line
96 edge
97 lateral surface of the platform
98 surface of the platform
99 radius
100 projection; nose
101 lateral surface of the housing appliance
102 projection; nose
103 edge
104 radius
105, 106 projection; nose
107 length
108 suction appliance
110 extension
a axial direction of the guide vane
A axial direction of the jet engine
B width of the core flow channel
r radial direction of the guide vane
R radial direction of the jet engine
u circumferential direction with respect to the middle axis of the guide vane
U circumferential direction of the jet engine

The invention claimed is:

1. A stator device for a continuous-flow machine with a housing appliance and a plurality of guide vanes that are arranged in a circumferentially distributed manner at the housing appliance,
wherein each of the plurality of guide vanes includes a blade with a pressure side and a suction side and a platform,
wherein the platform, at least in certain areas, forms a surface of an annular channel through which working fluid flows during operation of the stator device, and is mounted so as to be adjustable with respect to the housing appliance, and
wherein a flow area is provided via which a working fluid flows during operation of the stator device at least in certain areas in a radial direction of the stator device on a side of the platform that is facing away from the annular channel from the pressure side of the blade to the suction side of the blade,
wherein the flow area is formed by a gap extending circumferentially about a central axis of a spindle-shaped area of the platform in a radial direction of the each of the plurality of guide vanes between the platform and the housing appliance in the area of the surface of the annular channel, with the gap extending outwards from the surface of the annular channel in an axial direction of the central axis, and by a distance between a surface of the platform that is facing away from the annular channel in the radial direction of the stator device with respect to the housing appliance;

a suction appliance which adjoins the flow area and is formed by a recess, and via which working fluid can be conducted out of the flow area during operation of the stator device;

wherein the suction appliance is connected to the flow area to conduct working fluid out of the stator device for all adjustment positions of the platform.

2. The stator device according to claim 1, wherein the suction appliance directly adjoins the surface of the annular channel.

3. The stator device according to claim 1, wherein the suction appliance adjoins the flow area at a distance to the surface of the annular channel in the radial direction of the stator device.

4. The stator device according to claim 1, wherein the suction appliance extends substantially in the radial direction of the stator device.

5. The stator device according to claim 1, wherein the suction appliance is connected to the flow area in an area that is facing towards the pressure side of the blade.

6. The stator device according to claim 1, wherein the suction appliance extends in the circumferential direction of the each of the plurality of guide vanes across an angular range that is larger than 20°.

7. The stator device according to claim 1, wherein the suction appliance extends inside the housing appliance so as to substantially run along the circumference with respect to the central axis.

8. The stator device according to claim 1, wherein the housing appliance includes a recess that adjoins the annular channel in the area of the each of the plurality of guide vanes.

9. The stator device according to claim 1, wherein the platform is arranged in an axial direction of the stator device between two reference points of the annular channel, wherein a first reference point represents a boundary point of the annular channel, which is arranged upstream of a front end of the platform by 10% of an axial extension of the platform with respect to the central axis, and wherein a second reference point represents a boundary point of the annular channel, which is arranged downstream of a rear end of the platform by 10% of the axial extension of the platform with respect to the central axis, wherein an edge area of the platform projects into the annular channel with respect to a rectilinear connection of the two reference points in the radial direction of the stator device.

10. The stator device according to claim 9, wherein the edge area of the platform that projects into the annular channel with respect to the rectilinear connection of the two reference points is located in a front area of the platform in the axial direction of the stator device.

11. The stator device according to claim 9, wherein the edge area of the platform that projects into the annular channel extends into the annular channel by at least 0.3% of an extension of the annular channel with respect to a rectilinear connection of the reference points in the radial direction of the stator device in the area of the edge area of the platform.

12. The stator device according to claim 9, wherein the edge area of the platform that projects into the annular channel is rounded in a front or rear area in the axial direction of the stator device, wherein the edge area of the platform that projects into the annular channel includes a projection, and wherein the platform has a larger extension in the axial direction of the stator device in an area that is facing towards the annular channel than in an area that is facing away from the annular channel, wherein the projection overlaps the housing appliance that adjoins the platform in the axial direction of the stator device at least in certain areas.

13. The stator device according to claim 9, wherein the edge area of the platform that projects into the annular channel with respect to the rectilinear connection of the two reference points is located in a rear area of the platform in the axial direction of the stator device.

14. The stator device according to claim 9, wherein the edge area of the platform that projects into the annular channel extends into the annular channel by at least 0.8% of an extension of the annular channel with respect to a rectilinear connection of the reference points in the radial direction of the stator device in the area of the edge area of the platform.

15. The stator device according to claim 1, wherein the platform is arranged in an inner edge area of the blade with respect to the radial direction of the stator device.

16. A blade wheel device with a stator device according to claim 1 and a rotor device, wherein the suction appliance is connected to a conduit area via which working fluid can be supplied to the rotor device during operation of the blade wheel device.

17. The blade wheel device according to claim 16, wherein the conduit area has at least one nozzle via which the working fluid can be supplied to the rotor device during operation of the blade wheel device.

18. The stator device according to claim 1, wherein the suction appliance is connected to the flow area in an area that is facing towards the suction side of the blade.

19. The stator device according to claim 1, wherein the suction appliance extends in the circumferential direction of the each of the plurality of guide vanes across an angular range that is larger than 30°.

20. The stator device according to claim 1, wherein the platform is arranged in an outer edge area of the blade with respect to the radial direction of the stator device.

* * * * *